(12) United States Patent
Tsang et al.

(10) Patent No.: US 8,994,786 B2
(45) Date of Patent: Mar. 31, 2015

(54) MULTIPLE VIEW DISPLAY OF THREE-DIMENSIONAL IMAGES

(75) Inventors: Peter Wai Ming Tsang, Hong Kong (CN); Wu Chao Situ, Hong Kong (CN); Kayton Wai Keung Cheung, Hong Kong (CN)

(73) Assignee: City University of Hong Kong, Kowloon (HK)

(*) Notice: Subject to any disclaimer, the term of this patent is extended or adjusted under 35 U.S.C. 154(b) by 596 days.

(21) Appl. No.: 12/756,644

(22) Filed: Apr. 8, 2010

(65) Prior Publication Data
US 2011/0249087 A1 Oct. 13, 2011

(51) Int. Cl.
| | | |
|---|---|---|
| H04N 5/89 | (2006.01) | |
| H04N 13/00 | (2006.01) | |
| H04N 15/00 | (2006.01) | |
| H04N 9/82 | (2006.01) | |
| G03H 1/22 | (2006.01) | |
| G03H 1/30 | (2006.01) | |
| G03H 1/00 | (2006.01) | |

(52) U.S. Cl.
CPC .......... *H04N 9/8227* (2013.01); *G03H 1/2294* (2013.01); *G03H 1/30* (2013.01); *G03H 2001/0088* (2013.01); *G03H 2210/42* (2013.01); *G03H 2210/454* (2013.01); *G03H 2225/60* (2013.01)
USPC .............................................. 348/40; 348/41

(58) Field of Classification Search
None
See application file for complete search history.

(56) References Cited

U.S. PATENT DOCUMENTS

| | | | |
|---|---|---|---|
| 5,745,197 A | 4/1998 | Leung et al. | |
| 5,991,073 A * | 11/1999 | Woodgate et al. | 359/462 |
| 6,817,716 B1 | 11/2004 | Hines | |
| 7,492,523 B2 | 2/2009 | Dolgoff | |
| 7,537,345 B2 | 5/2009 | Refai et al. | |
| 7,568,803 B2 | 8/2009 | Vrachan et al. | |
| 2002/0191841 A1 | 12/2002 | Harman | |
| 2005/0018308 A1* | 1/2005 | Cassarly et al. | 359/630 |
| 2005/0270645 A1* | 12/2005 | Cossairt et al. | 359/463 |
| 2006/0171008 A1* | 8/2006 | Mintz et al. | 359/15 |
| 2008/0012850 A1* | 1/2008 | Keating, III | 345/419 |
| 2011/0216160 A1 | 9/2011 | Martin | |

OTHER PUBLICATIONS

Lugmayr; Luigi, "Vizoo Cheoptics360 XL Amazing Holographic Display," Oct. 10, 2006, http://www.i4u.com/article6786.html.

(Continued)

*Primary Examiner* — Joseph Ustaris
*Assistant Examiner* — Kevin McInnish
(74) *Attorney, Agent, or Firm* — Amin, Turocy & Watson, LLP

(57) ABSTRACT

Systems, methods, and devices that generate and display a multiple view 3-D holographic image ("image") of a 3-D real or synthetic scene are presented. A projection system captures visual information of the 3-D scene from various perspectives and generates model data to create a 3-D model of the scene. The model data is converted to holographic data, which is respectively portioned corresponding to the respective perspectives of the scene and used to generate and display respective portions of the image on respective display sections. The display sections can be separate display sections corresponding to the various perspectives, or the display sections can be on a single display that is divided into sections for the various perspectives and a 3-D adapter is employed to facilitate display of the image in the display area, wherein reflector components can be used to reflect the portions of the image to the display area.

20 Claims, 17 Drawing Sheets

(56) References Cited

OTHER PUBLICATIONS

Shenzhen Fantasy Sky digital Technology Co., Ltd. "Holography360," accessed Apr. 8, 2010, http://www.szhtsm.cn.

A. Jones et al., "Rendering for an Interactive 360° Light Field Display", Siggraph, 2007, http://gl.ict.usc.edu/Research/3DDisplay.

http://www.youtube.com/watch?v=PguNPIXfnOs.

Office Action dated Jul. 3, 2013 for U.S. Appl. No. 13/155,634, 48 pages.

George Wolberg. "Image Morphing: a Survey," The Visual Computer. City College of New York, New York, NY, 1998, 14:360-372.

* cited by examiner

MULTIPLE VIEW DISPLAY OF THREE-DIMENSIONAL IMAGES

TECHNICAL FIELD

The subject disclosure relates generally to image displays, and in particular, to systems, methodologies, and devices that can provide multiple view display of three-dimensional images.

BACKGROUND

Since the appearance of the Princess Leia holographic message in the 1970's Star War movie, researchers have been exploring the feasibility of producing a real world prototype. Recently, similar excitement has been stirred up in the community with the "Three Dimensional (3-D) forensic chamber" in the television series "Bones". The closest systems that have been built so far are the Cheoptic-360 and the Holography-360, which allows a Two Dimensional (2-D) object scene to be floated in mid-air and observed by viewers from the four sides. However, it is simply the projection of a 2-D planar image, and there is no depth or disparity information as in the original object scene.

Generation of a floating image can be achieved with aerial projection. To generate a floating image, a real object is placed in an area which is generally not visible to the viewer. When illuminated, an image of the object is reflected by a beam-splitter and observable as a virtual image by the viewer, creating the impression of the object image floating in air. A background image, or a concave mirror, is sometimes added to enhance the effect. One of the significant disadvantages of this approach is the requirement of a real object.

Another method has been employed to remove the need of a real object, wherein a 2-D image of the real object is captured by a camera, and reproduced with certain display device such as a cathode ray tube (CRT) monitor, liquid crystal display (LCD) monitor, or an optical projector. The image produced by the display device is reflected by a beam-splitter and projected to the viewer as a virtual, floating image. Similarly, a background image or a concave mirror is sometimes used to provide the illusion of a 3-D effect.

The above methods and systems only provide viewers the ability to observe the floating image from a single direction. An existing product known as the "HoloCube 3D Projection Box" is based on similar principles. Recently, this has been extended to integrate two or more such aerial projection units, each projecting a floating image independently along a unique direction. The directions of projection are generally two or more of the following: front, left, right, back. An advantage of this approach is that viewers can observe the projected image from an aerial projection unit, as well as the environment behind the aerial projection unit. In this product, there is no background device or mirrors to block the sight of the viewer. Such concept has been adopted in the Cheoptic-360 system and the Holography-360 system. However, with these systems, the floating image lacks the 3-D information, such as the depth perception, and parallax is absent as the observers move their viewing positions with respect to the displayed image.

It is desirable to be able to generate a 3-D image that can be viewed from more than one vantage point, as well as providing desired depth perception and parallax information (e.g., disparity information), as opposed to conventional projection of a 2-D image onto one or more transparent screens. It is also desirable to project such a 3-D image in a less complicated and more economical manner than conventional approaches, such as the foreground/background approach (e.g., as found in Dolgoff, U.S. Pat. No. 7,492,523, "Method for displaying a three-dimensional scene"), the multi-layer display (e.g., as found in Leung et al., U.S. Pat. No. 5,745,197, "Three-dimensional real-image volumetric display system and method"; and Refai et al., U.S. Pat. No. 7,537,345, "Volumetric liquid crystal display for rendering a three-dimensional image"), and the spinning mirror (e.g., Jones et al., "Rendering for an Interactive 360° Light Field Display", Siggraph, 2007). Further, it is desirable to be able to generate such a 3-D image without the need to use real objects as the source of the optical image.

SUMMARY

The following presents a simplified summary of the innovations in order to provide a basic understanding of some aspects described herein. This summary is not an extensive overview of the disclosed subject matter. It is intended to neither identify key or critical elements of the disclosed subject matter nor delineate the scope of the subject innovations. Its sole purpose is to present some concepts of the disclosed subject matter in a simplified form as a prelude to the more detailed description that is presented later.

The disclosed subject matter relates to systems, methods, and devices that can generate and display a multiple view three-dimensional (3-D) holographic image of a 3-D scene (e.g., real or synthetic 3-D scene comprising a real or synthetic object(s)) in accordance with various embodiments and aspects disclosed herein. In an aspect, a multiple view aerial holographic projection system (MVAHPS) can include a holographic projection module(s) (HPM(s)) that can generate and display a 3-D holographic image of a 3-D scene as viewed from multiple viewing perspectives (e.g., front view, left-side view, back view, right-side view, etc.) based at least in part on visual information associated with the 3-D scene, wherein the visual information can be based at least in part on multiple viewing perspectives of the 3-D scene. When the 3-D scene is a real 3-D scene, a capture system (e.g., employing a desired number of capture components, such as a camera array) can capture visual information associated with the 3-D scene (e.g., information relating to the scattering of optical waves with respect to the 3-D scene) from multiple viewing perspectives. When the 3-D scene is a synthetic 3-D scene, the synthetic 3-D scene can be generated as a 3-D computer model of the desired 3-D scene, wherein desired different viewing perspectives of the 3-D computer model can be synthesized.

In another aspect, an HPM can comprise a reproductor component (e.g., optical wave reproduction unit) that can include one or more display components, which can be or can comprise one or more display sections (e.g., holographic display sections (HDSs), which can be utilized for displaying the 3-D holographic image from the multiple viewing perspectives. The reproductor component can generate holographic data representative of the real or synthesized 3-D scene based at least in part on the visual information and/or the 3-D computer model associated with the real or synthetic 3-D scene, where the holographic data can be used to facilitate generating or producing a 3-D holographic image corresponding to the 3-D scene from multiple viewing perspectives. In accordance with various embodiments, the display components can be a liquid crystal display (LCD) (e.g., high resolution LCD), spatial light modulator (SLM), or autostereoscopic display. When an autostereoscopic display is employed, a 3-D adapter can be adhered to the autostereoscopic display to facilitate adjusting, improving, or enhancing the 3-D holographic image for display. In still another aspect, the multiple display sections can be associated with a corresponding number of reflector components (e.g., beam splitters) that can be arranged at a desired angle in relation to the respective display components to reflect at least a desired portion of the respective 3-D holographic image portions (e.g., respective optical waves of the respective 3-D holographic portions, wherein the optical waves are derived from the 3-D scene), which are received from the respective display sections, to the desired display area (e.g., 3-D chamber). As the optical waves of the 3-D holographic scene are derived from the original 3-D scene, the 3-D holographic image produced can preserve at least a desired amount of the 3-D aspects, such as depth perception and parallax information, associated with the original 3-D scene.

In accordance with an embodiment, a display component can comprise a multiple section autostereoscopic display (MSAD), which can be a single electronic accessible display, and can be divided into a desired number of display sections, for example, corresponding to a desired number of viewing perspectives for the 3-D holographic image (e.g., based at least in part on the available viewing perspectives associated with the original 3-D scene). In an aspect, the display screen of the display component can be divided into the desired number of display sections having a desired shape that can maximize the display area of each display section. For example, if the display screen has a rectangular shape, and the display screen is desired to be divided into four display sections, for instance, to display a front view, left-side view, back view, and right-side view of a 3-D holographic image, it can be desirable to divide the display screen into four triangular-shaped contiguous display sections as this can maximize the display area by allowing the entire display screen to be used. One or more embodiments also can facilitate dividing a display screen into display sections of different shapes and sizes, wherein the shape or size employed still enables desired display of the 3-D holographic image. A 3-D adapter can be shaped to correspond to the shape of the display section, as divided, and each of the display sections can have a 3-D adapter attached thereto. In another embodiment, the MSAD can be formed from multiple display components (e.g., multiple electronic accessible displays).

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
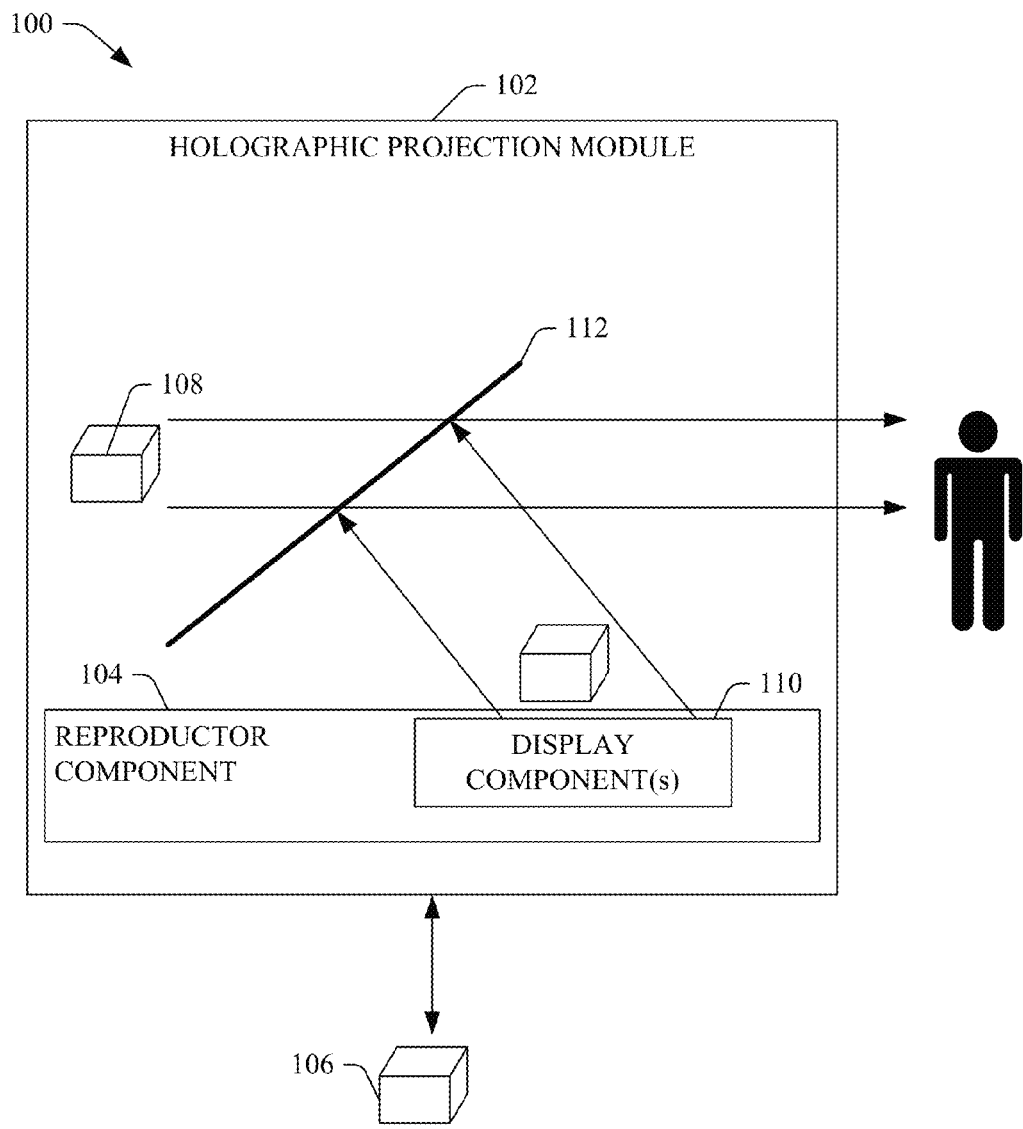
FIG. 1 illustrates a block diagram of an example system that can generate and display a multiple view three-dimensional (3-D) holographic image of a 3-D scene in accordance with various embodiments and aspects.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Conventionally, projections systems have been able to display a two-dimensional (2-D) image of a scene as if floating in mid-air, where a background image or concave mirror is employed to help simulate or enhance a three-dimensional (3-D) effect for the image. In addition to only displaying a 2-D image, another disadvantage of such conventional projection systems is that they require a real object be used for the scene. Other conventional projection systems have integrated two or more aerial projection units, each projecting a floating image independently along a unique direction. This can allow viewers to observe the projected image from an aerial projection unit as well as the environment behind the aerial projection unit. However, the floating image displayed by these conventional systems lacks desired 3-D information, such as depth perception, and parallax is absent as the viewers move their viewing positions with respect to the image. It is desirable to be able to efficiently generate and display a 3-D holographic image of a 3-D real or synthetic scene that preserves desired 3-D information, such as depth perception and parallax.

To that end, systems, methods, and devices that can generate and display a multiple view 3-D holographic image of a 3-D real or synthetic, static or animated scene are presented. A projection system can capture or receive visual information of the 3-D scene from various perspectives (e.g., front side, left side, back side, right side) and can generate model data to create a 3-D model of the scene. The model data can be converted to holographic data, and the holographic data can be respectively portioned corresponding to the respective perspectives of the scene and used to generate and display respective portions of the 3-D holographic image on respective display sections. In accordance with various embodiments, the display sections can be separate holographic display sections corresponding to the various perspectives and reflector components (e.g., beam splitters) can be used to reflect the portions of the 3-D holographic image to a display area, or the display sections can be on a holographic display that is divided into a desired number of sections corresponding to the various perspectives and a 3-D adapter can be employed to facilitate display of the 3-D holographic image in the display area.

FIG. 1 illustrates a block diagram of an example system 100 that can generate and display a multiple view 3-D holographic image of a 3-D scene in accordance with various embodiments and aspects. In an aspect, the system 100 can be a multiple view aerial holographic projection system (MVAHPS) that can generate and display a 3-D holographic image of a 3-D real or synthetic, static or animated scene viewable from multiple perspectives, wherein the 3-D holographic image can be viewed, for example, as an image floating in mid-air in a desired display area (e.g., 3-D chamber). The system 100 can comprise one or more holographic projection modules (HPMs) 102 that can each include a reproductor component 104 (e.g., optical wave reproduction unit) that can reproduce optical waves associated with the 3-D scene 106 to facilitate projecting a 3-D holographic image 108 of the 3-D scene 106 from multiple views (e.g., front side, left side, back side, right side, . . . ). It is to be appreciated and understood that only one HPM 102 is depicted in FIG. 1 for brevity and clarity.

In accordance with an aspect, the HPM 102 can perform real-time capturing of real world 3-D scenes, as well as building synthetic graphic models of synthetic 3-D scenes, to be displayed in the display area (e.g., displayed on the 3-D chamber). In another aspect, the reproductor component 104 can process the captured or received visual information associated with the original 3-D scene 106, wherein the visual information can comprise respective portions of visual information respectively associated with the respective viewing positions in relation to the original 3-D scene 106 that were captured by the HPM 102 along those respective viewing positions (e.g., using a capture components such as an array of cameras, with a camera at each viewing position) for a real 3-D scene, or can comprise respective portions of visual information respectively associated with the respective viewing positions in relation to the original 3-D scene 106, wherein the visual information was generated to synthesize a 3-D scene, and the respective portions of the visual information are received by the HPM 102, wherein the respective portions of visual information can correspond to the respective viewing positions for a synthetic 3-D scene.

The reproductor component 104 can process the respective portions of the visual information associated with the 3-D scene 106 and can generate model data based at least in part on the visual information portions, wherein the model data can be used to create a 3-D model of the original 3-D scene 106. The reproductor component 104 can convert the model data (e.g., respective portions of model data corresponding to respective viewing positions in relation to the 3-D scene 106) into holographic data to facilitate generating a 3-D holographic image 108 as a reproduction of the 3-D scene 106.

The reproductor component 104 can generate the 3-D holographic image 108 based at least in part on the holographic data associated with the 3-D scene 106. For instance, respective portions of the holographic data corresponding to respective viewing positions in relation to the 3-D scene 106 can be used to generate respective portions of the 3-D holographic image 108.

In still another aspect, the reproductor component 104 can include one or more display components 110 (e.g., color or monochrome display) where a display component 110 can be a holographic display section (HDS) that can reproduce at least partially the optical wave scattered by the scene 106 (e.g., real scene) along a specific viewing position with respect to the scene 106. The reproductor component 104 can provide the respective portions of the holographic data or respective portions of the 3-D holographic image 108 to respective display components 110, wherein the respective display components 110 can be respectively positioned in relation to a display area, wherein the image 108 is to be projected, to correspond with the respective viewing positions of the original 3-D scene 106, so that the 3-D holographic image 108 will be an accurate reproduction of the original 3-D scene 106. That is, the display components 110 can be spatially juxtapositioned with respect to each other and the scene to allow viewers of the 3-D holographic image 108 of the 3-D scene 106 to observe a realistic reproduction of the 3-D scene 106 from different perspectives (e.g., viewing angles or positions). For example, there can be four display components 110 where the first display component 110 can reproduce at least partially the optical wave scattered by the scene 106 along a viewing position at the front portion of the scene 106; the second display component 110 can reproduce at least partially the optical wave scattered by the scene 106 along a viewing position at the left-side portion of the scene 106; the third display component 110 can reproduce at least partially the optical wave scattered by the scene 106 along a viewing position at the back portion of the scene 106; and the fourth display component 110 can reproduce at least partially the optical wave scattered by the scene 106 along a viewing position at the right-side portion of the scene 106. For each display component 110 associated with the scene 106, the optical waves that emerge from the display component 110 reproduces with a desired degree of fidelity, a virtual 3-D image of the original scene 106 along the specific viewing position with respect to the scene 106 with which the display component 110 is associated.

In yet another aspect, each display component 110 can be associated with a reflector component 112 that can reflect a desired portion of the 3-D holographic image to direct the desired portion of the 3-D holographic image to the display area, so that the image is viewable by an observer(s). In an embodiment, the reflector component 112 can be a beam splitter that can receive the optical waves associated with the 3-D holographic image projected by the corresponding display component 110 and can reflect at least partially the 3-D holographic image 108 (e.g., 3-D virtual image) of the original scene 106 (e.g., the portion of the 3-D holographic image 108 corresponding to the specific viewing position with respect to the scene 106 with which the display component 110 is associated) to project that 3-D holographic image 108 to the display area, for example, as a floating 3-D image. The respective portions of the 3-D holographic image 108 respectively associated with the respective display components 110 can be projected by the display components 110 and associated reflector components 112 so that the respective portions appear as a cohesive 3-D holographic image 108 to the viewer. As the optical waves are derived from the original 3-D scene 106, the 3-D holographic image 108 produced by the HPM 102 preserves, at least to a desired extent, the depth perception as well as the parallax information associated with the original scene 106. As a result, a viewer observing the 3-D holographic image 108 can experience the depth and the parallax or disparity, for example, when changing viewing positions with respect to the image 108 (e.g., as the observer views the 3-D holographic image from different vantage points as the observer walks around the display area). In still another aspect, the HPM 102, including the reproductor component 104, display component(s) 110 and reflector component(s) 112, can employ various parameters (e.g., illumination parameters for the display component 110, parameters relating to angle of the reflector component 112 with respect to the associated display component 110, parameters relating to capturing visual information relating to a scene, parameters relating to level of reflection of the 3-D holographic image by the reflector component 112, etc.) that can be controlled via the HPM 102 and/or a computing device (e.g., computer) associated with the HPM 102.

The various embodiments of the subject disclosure can be employed for numerous applications, which can include, for example, 3-D movie viewing, advertisements, video games, and scientific research. Further, one or more embodiments, with the advancement of the technology, as desired, can be realized with available electronics and computing resources, and moderate changes in the existing video framework. As a result, such embodiments are economical and can be easily utilized by movie producers, graphic designers, and content providers in general.

It is to be appreciated and understood, that while system 100 is shown with one HPM 102, one reproductor component 104, one display component 110, and one reflector component 112, the various embodiments described herein are not so limited as there can be any desired number of HPMs 102, reproductor components 104, display components 110, and reflector components 112. Further, an HPM 102 can have any desired number of display components 110. Also, while one 3-D scene 106 is depicted and one 3-D holographic image 108 is reproduced based at least in part on that scene 106, the subject disclosure is not so limited as there can be more than one 3-D scene 106 for which the HPM 102 can reproduce a corresponding number of 3-D holographic images 108, as desired, wherein each 3-D scene 106 can comprise one or more objects (e.g., persons, items, etc.).

Figure 2:
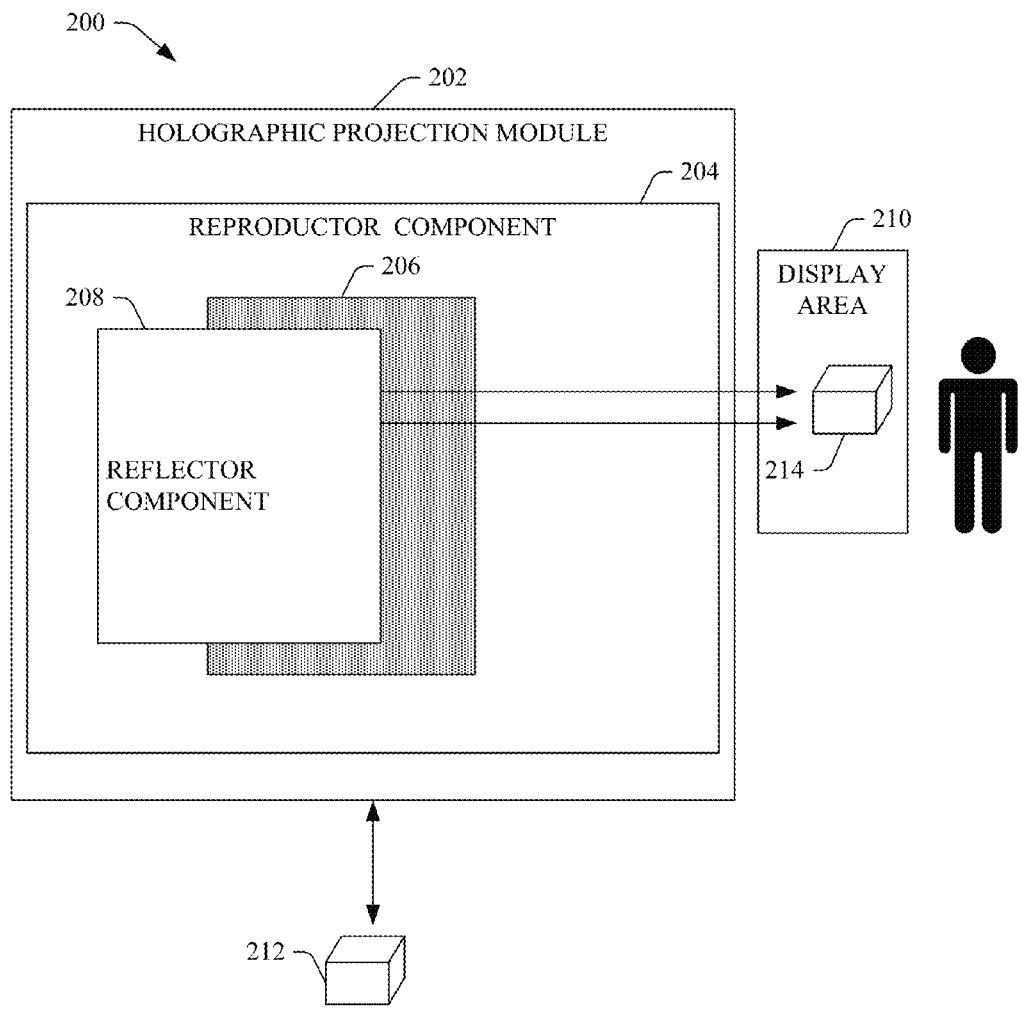
FIG. 2 depicts a diagram of a top view of an example system that can generate and display a multiple view 3-D holographic image of a scene in accordance with an embodiment of the disclosed subject matter.

Referring briefly to FIG. 2 (along with FIG. 1), FIG. 2 depicts a diagram of a top view of an example system 200 that can generate and display a multiple view 3-D holographic image of a scene in accordance with an embodiment of the disclosed subject matter. In an aspect, the system 200 can be a MVAHPS that can generate and display a 3-D holographic image of a 3-D real or synthetic, static or animated scene viewable from multiple perspectives. The system 200 can include an HPM 202, a reproductor component 204, a display component 206, and a reflector component 208, that each can comprise the same or similar functionality or features of respective components (e.g. respectively named components), such as more fully described herein, for example, with regard to system 100. In an aspect, the display component 206 can be positioned as desired with respect to a surface (e.g., placed horizontal on a flat surface). The reflector component 208 can be positioned above the associated display component 206 at a desired distance away from the display component 206 and can be angled (not shown in FIG. 2; for example, as depicted in FIG. 1) at a desired angle with respect to the associated display component 110 and the display area 210 (e.g., 3-D chamber). In an aspect, the HPM 102 can capture or receive visual information associated with an original 3-D scene 212 (e.g., capture optical waves associated with a real 3-D scene from multiple viewing positions; receive data that synthesizes a 3-D scene from multiple viewing positions) and can reproduce the original 3-D scene 212, or a desired portion thereof (e.g., along a specific viewing angle with respect to the scene 212), as a 3-D holographic image 214 in the display area 210.

Figure 3:
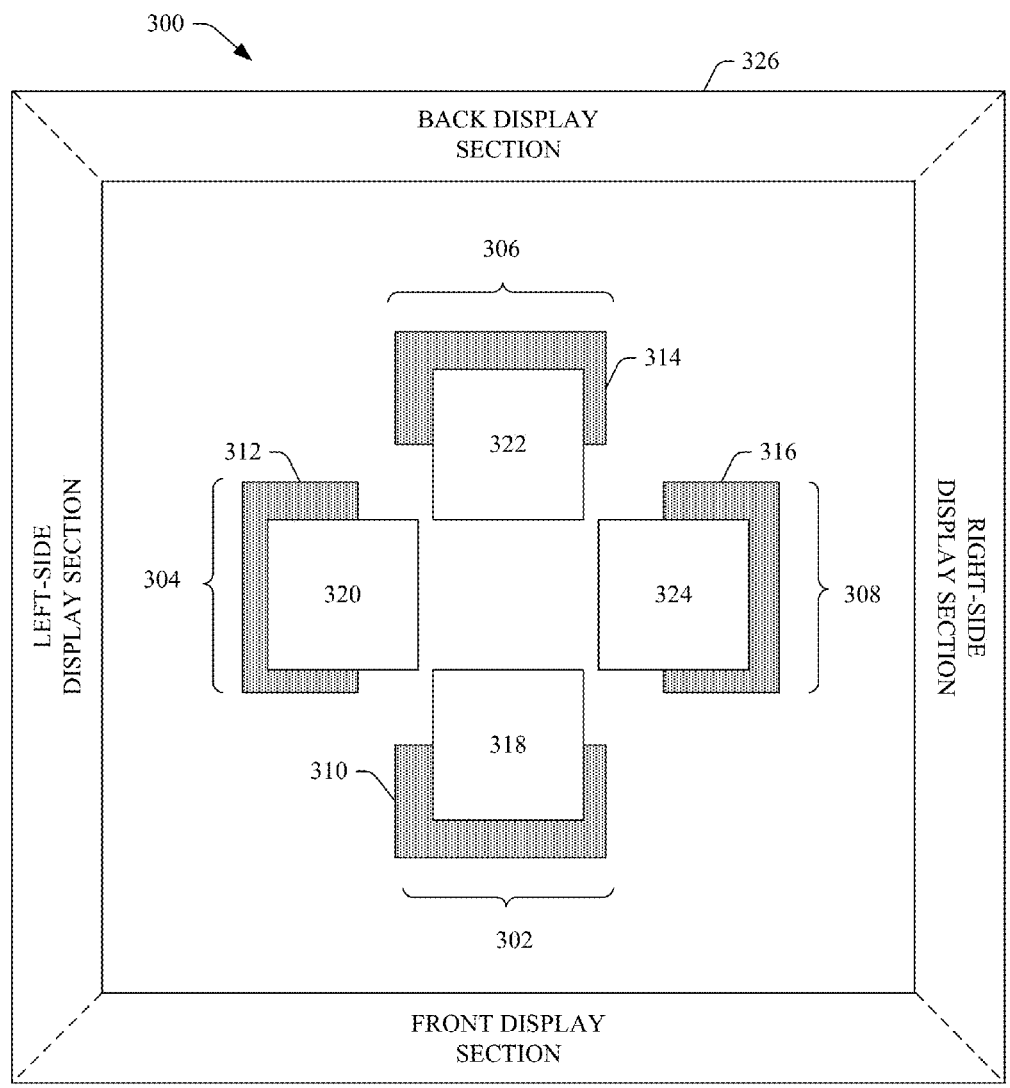
FIG. 3 illustrates a diagram of a top view of an example system that can employ multiple display components to generate and display a multiple view 3-D holographic image of a scene in accordance with an embodiment of the disclosed subject matter.

Turning to FIG. 3 (along with FIG. 1), FIG. 3 illustrates a diagram of a top view of an example system 300 that can employ multiple display components to generate and display a multiple view 3-D holographic image of a scene in accordance with an embodiment of the disclosed subject matter. In an aspect, the system 300 can be a MVAHPS that can generate and display a 3-D holographic image of a 3-D real or synthetic, static or animated scene viewable from multiple perspectives, such as a front view, left-side view, back view, and right-side view of the 3-D scene. The system 300 can comprise four HPMs 302, 304, 306 and 308, four display components 310, 312, 314 and 316 (e.g., HDSs), and four reflector components 318, 320, 322 and 324 (e.g., beam splitters), that can each comprise the same or similar functionality or features of respective components (e.g. respectively named components), such as more fully described herein, for example, with regard to system 100 and system 200. Each of the HPMs can include reproductor components (which can comprise the respective display components 310, 312, 314, and 316; however, for brevity and clarity, the reproductor components are not shown in FIG. 3.

In an aspect, the HPMs 302, 304, 306 and 308 can project a corresponding 3-D image of the respectively associated display components 310, 312, 314 and 316, to respectively unique directions. In accordance with an embodiment, the four HPMs 302, 304, 306 and 308 can project four respective holographic 3-D images (e.g., front view image portion, left-side view image portion, back view image portion, and right-side view image portion of the original scene) to the front direction, left-side direction, back direction, and right-side direction. The respective holographic 3-D images, that is, the respective optical waves of the 3-D holographic images, that are projected from (e.g., emerging from) the respective display components 310, 312, 314 and 316 can be reflected, at least partially, off of the respective reflector components 318, 320, 322 and 324 so that the respective holographic 3-D images can be displayed together in a display area 326 (e.g., 3-D chamber), which can be in an area located outside of the four HPMs 302, 304, 306 and 308, and which can comprise, for example, a front display section, left-side display section, back display section and right-side display section that respectively can display the respective 3-D holographic image portions projected from the four HPMs 302, 304, 306 and 308, to facilitate presenting the 3-D holographic image of the original scene as a whole 3-D holographic image to viewers. The reflector components 318, 320, 322 and 324 can be angled at a desired angle in relation to the display components 310, 312, 314 and 316 to facilitate accurate reflection of the respective holographic 3-D images to the desired positions in the display area 326.

It is to be appreciated and understood that the while system 300 is shown with four HPMs 302, 304, 306 and 308, four display components 310, 312, 314 and 316, and four reflector components 318, 320, 322, and 324, the subject disclosure is not so limited, as there can be virtually any number (e.g., less than four, four, more than four) of HPMs, display components, and/or reflector components, as desired. Further, in accordance with various embodiments, the subject disclosure can comprise an HPM that comprises multiple display components (e.g., a single HPM can include four display components); and/or a single or other desired number of display components can be employed, wherein the display component(s) can comprise more than one display section, wherein each display section can display or project a respective portion of the 3-D holographic image. For example, as desired, a 3-D scene can be captured by virtually any desired number of capture components (e.g., 1, 2, 3, . . . , 120, . . . , 240, . . . , 360, . . . ) from different viewing perspectives (e.g., when 360 capture components are employed, each of the capture components can be placed one degree apart from each other, for instance, forming a circle of capture components around the 3-D scene), and the captured visual information associated with the 3-D scene can be used to generate respective portions of a 3-D holographic image, and a corresponding number of display sections can be employed to facilitate producing and displaying the respective portions of the 3-D holographic image of the 3-D scene as an integrated 3-D holographic image in the display area. It is also to be appreciated and understood that the while the display components 310, 312, 314 and 316 and reflector components 318, 320, 322, and 324 are depicted as being rectangular in shape, the subject disclosure is not so limited, and the display components and reflector components can be shaped in virtually any desired shape (e.g., triangle, square, rectangle, circular, oval, irregular shape, etc.).

With regard to FIG. 1, in accordance with another aspect, the display component 110 (e.g., HDS) can project or emit a computer-generated off-axis 3-D hologram image, or desired portion thereof (e.g., corresponding to a unique viewing position with respect to the original scene), wherein the computer-generated off-axis 3-D hologram image, for example, can be printed on a static media such as a photographic film, or can be displayed on an electronic accessible device such as a Spatial Light Modulator (SLM).

For instance, the following process can be employed to facilitate display of the computer-generated off-axis 3-D hologram image. In an aspect, an original 3-D scene can be composed of a collection of 3-D object points given by $O(x,y,z)=[o_0(x_0, y_0, z_0), o_1(x_1, y_1, z_1), \ldots, o_{N-1}(x_{N-1}, y_{N-1}, z_{N-1})]$.

An on-axis Fresnel hologram $H_{on}(x,y)$ can be generated numerically employing the following equation (1).

$$H_{on}(x, y) = \sum_{j=0}^{N-1} \frac{a_j}{r_j} \exp(ikr_j) \tag{1}$$

where $k=2\pi/\lambda$ is the wave number of the laser light with $\lambda$ being the wavelength of the laser light. $a_j$ can represent the amplitude of the 'jth' object point, and $r_j = \sqrt{(x_j-x)^2+(y_j-y)^2+z_j^2}$ can be the distance between the object point $(x_j, y_j, Z_j)$ and a point $(x,y)$ on the hologram. With regard to Equation (1), it is assumed the hologram is on the x-y plane (e.g., on the z=0 plane) and the object point is at a perpendicular distance $z_j$ away from the hologram. The diffraction patterns of the 3-D object is a superposition of Fresnel zone plates (FZPs) (e.g., the function $\exp(ikr_j)$) each contributed by a unique object point. The process can be interpreted as a numerical realization of holograms generated by optical scanning holography.

An off-axis hologram can be derived from $H_{on}(x,y)$ by adding a planar, or a spherical reference beam $B(x,y)$ with certain angle of illumination as $$H(x,y)=H_{on}\cdot B(x,y) \tag{2}$$

To produce the hologram on printed media, such as a photographic film, or displaying the hologram on electronic accessible device, such as an SLM, only the real part $H'(x,y)$ of the hologram is retained as given by $$H'(x,y)=Re[H(x,y)]. \tag{3}$$

A reason only the real part of the hologram is retained is that only the real part of the hologram can be displayed. A display component 110 (e.g., HDS) can be constructed with a printed media, or an electronic accessible device (e.g., SLM) which displays the hologram $H'(x,y)$.

In accordance with yet another aspect, the display component 110 can be a 3-D hologram representing the optical waves scattered by a real scene, and the 3-D hologram can be acquired with desired optical means, such as by employing a desired number of capture components (e.g., cameras) (not shown), in respective spatial positions in relation to the real scene, to capture the optical waves scattered by the real scene from the respective spatial positions. The 3-D hologram representing the real scene can be reproduced based at least in part on the visual information (e.g., captured visual information, such as scattered optical waves) relating to the real scene.

Figure 4:
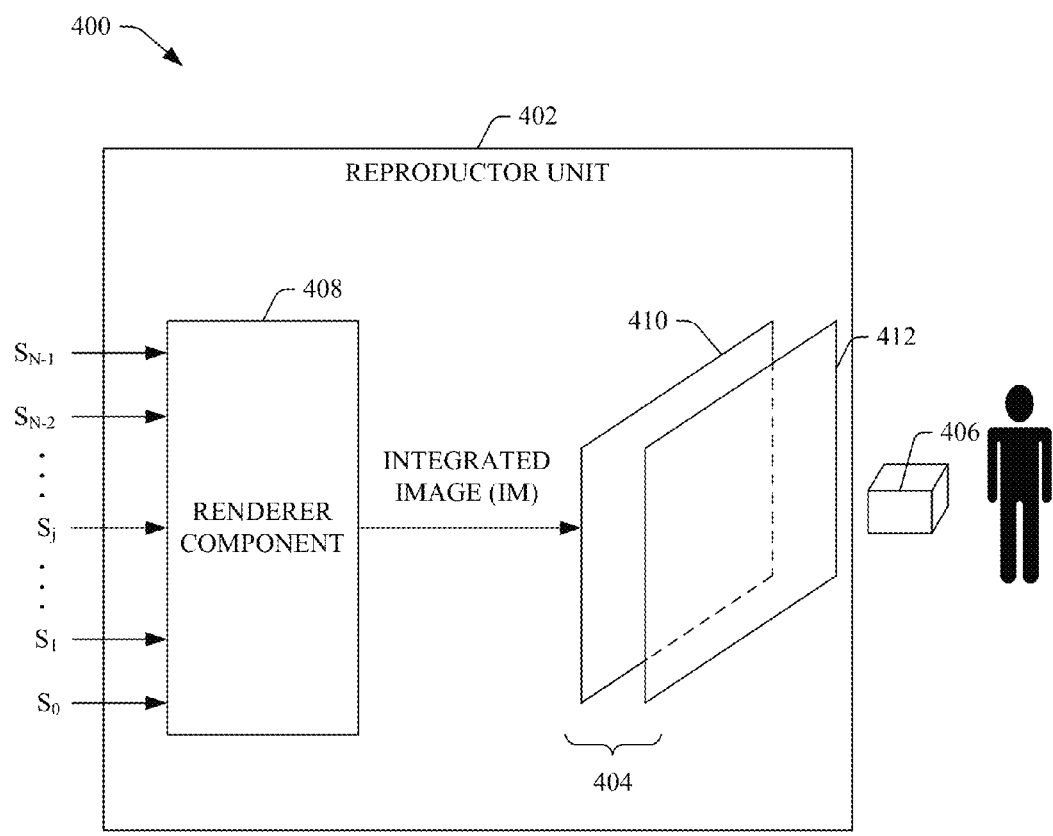
FIG. 4 depicts a diagram of an example system that can employ a multiple section display component(s), comprising an autostereoscopic display(s), to generate and display a multiple view 3-D holographic image of a scene in accordance with various embodiments of the disclosed subject matter.

FIG. 4 illustrates a diagram of an example system 400 that can employ a multiple section display component(s), comprising an autostereoscopic display(s), to generate and display a multiple view 3-D holographic image of a scene in accordance with various embodiments of the disclosed subject matter. In an aspect, the system 400 can include a reproductor component 402 that can reproduce optical waves associated with the 3-D scene to facilitate projecting a 3-D holographic image of the 3-D scene from multiple views (e.g., front side, left side, back side, right side, . . . ). The reproductor component 402 can comprise a display component 404, which can be an autostereoscopic display (a multiple section autostereoscopic display (MSAD)) employed for displaying a 3-D holographic image 406 of the scene in a desired display area for viewing by observers. The reproductor component 402 and display component 404 each can comprise the same or similar functionality or features, or at least a desired portion thereof, of respective components (e.g. respectively named components), such as more fully described herein, for example, with regard to system 100, system 200, and system 300.

Figure 5:
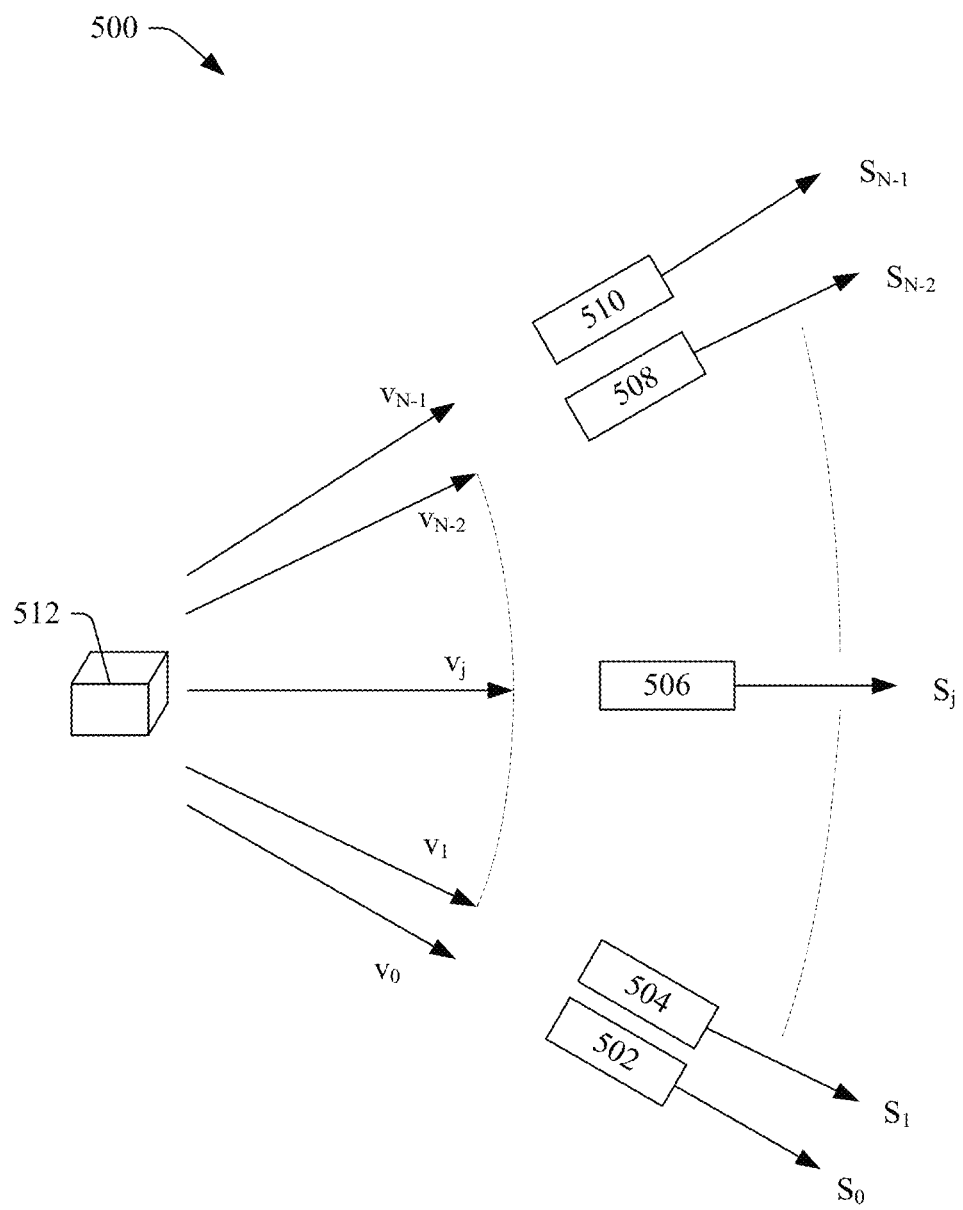
FIG. 5 depicts an example system for capturing a 3-D scene from multiple viewing positions to facilitate reproducing a 3-D holographic image in accordance with an embodiment of the disclosed subject matter.

In an aspect, the reproductor component 402 can be associated with a capture system (e.g., as shown in FIG. 5; not shown in FIG. 4) that can be employed to capture visual information (e.g., optical waves scattered by the scene from various viewing positions with respect to the scene) and provide the visual information to the reproductor component 402, wherein the reproductor component 402 can reproduce and display the scene in the form of a 3-D holographic image 406 in a desired display area based at least in part on the visual information received from the capturing system.

Referring briefly to FIG. 5 (along with FIG. 4), depicted is an example system 500 for capturing a scene (e.g., real 3-D scene comprising one or more objects) from multiple viewing positions to facilitate reproducing a 3-D holographic image in accordance with an embodiment of the disclosed subject matter. In an aspect, the system 500 (e.g., capture system) can comprise a plurality of capture components (e.g., an array of cameras), such as capture components 502, 504, 506, 508 and 510, that can be positioned on a horizontal plane, for example, wherein each of the capture components 502, 504, 506, 508 and 510 can capture the projected image of the 3-D scene 512 from a respective specific direction in relation to the 3-D scene 512. For instance, as depicted in system 500 of FIG. 5, there can be N views $[v_0, v_1, \ldots, v_{N-2}, v_{N-1}]$ of the 3-D scene 512 (e.g., 3-D object scene). Each view $v_j|_{0 \leq j < N}$ of the 3-D scene 512 can be captured by a unique capture component of the plurality of capture components, and recorded as a 2-D image $S_j|_{0 \leq j < N}$, for example, as visual information associated with the 3-D scene 512 from the respective view. The N respective views of the 3-D scene 512, which can be recorded in the N 2-D images $[S_0, S_1, \ldots, S_{N-2}, S_{N-1}]$, can contain the disparity of each point in the 3-D scene 512 along the horizontal direction. In other words $[S_0, S_1, \ldots, S_{N-2}, S_{N-1}]$ can record the horizontal parallax information of the 3-D scene 512. In accordance with an aspect, the respective visual information (e.g., captured N 2-D images) associated with the N respective views of the 3-D scene 512 can be received and recorded (e.g., stored in memory, stored on print media) by the reproductor component 402 and/or a recording device (not shown), which can provide the visual information to the reproductor component 402.

With regard to FIG. 4 and system 400, in an aspect, the reproductor component 402 can comprise a renderer component 408 that can generate a 3-D integrated image representing the 3-D scene. As stated herein, the reproductor component 402 can include a display component 404, which can be an autostereoscopic display. In another aspect, the renderer component 408 can be associated with (e.g., connected to) the display component 404. The renderer component 408 can receive the visual information associated with the 3-D scene, that is, the multi-view images $[S_0, S_1, \ldots, S_{N-2}, S_{N-1}]$ captured by the capture system (e.g., system 500) can be input to the renderer component 408, and the renderer component 408 can generate a 3-D integrated image IM based at least in part on the visual information associated with the 3-D scene. For instance, the renderer component 408 can generate holographic data, based at least in part on the visual information associated with the 3-D scene, and the holographic data can be used by the display component 404 to reproduce and display the 3-D holographic image 406 representing the 3-D scene. The 3-D integrated image (e.g., 3-D integrated holographic image) can be displayed by the display component 404 in the desired display area where observers can view the 3-D holographic image 406.

In still another aspect, the display component 404 can be comprised of a display 410 (e.g., electronic accessible display), which can be an LCD (e.g., high resolution LCD) or other desired type of display, and a 3-D adapter component 412, which can be associated with the display 410 and can be utilized to adjust the 3-D holographic image displayed or provided by the display 410 to improve or enhance the 3-D aspects of the 3-D holographic image displayed by the display 410. For instance, the 3-D adapter component 412 can be adhered or attached to the display surface of the display 410. In accordance with various embodiments, the 3-D adapter component 412 can be a slant or vertical lenticular lens, a slant or vertical parallax barrier, or other desired 3-D adapter.

Figure 6:
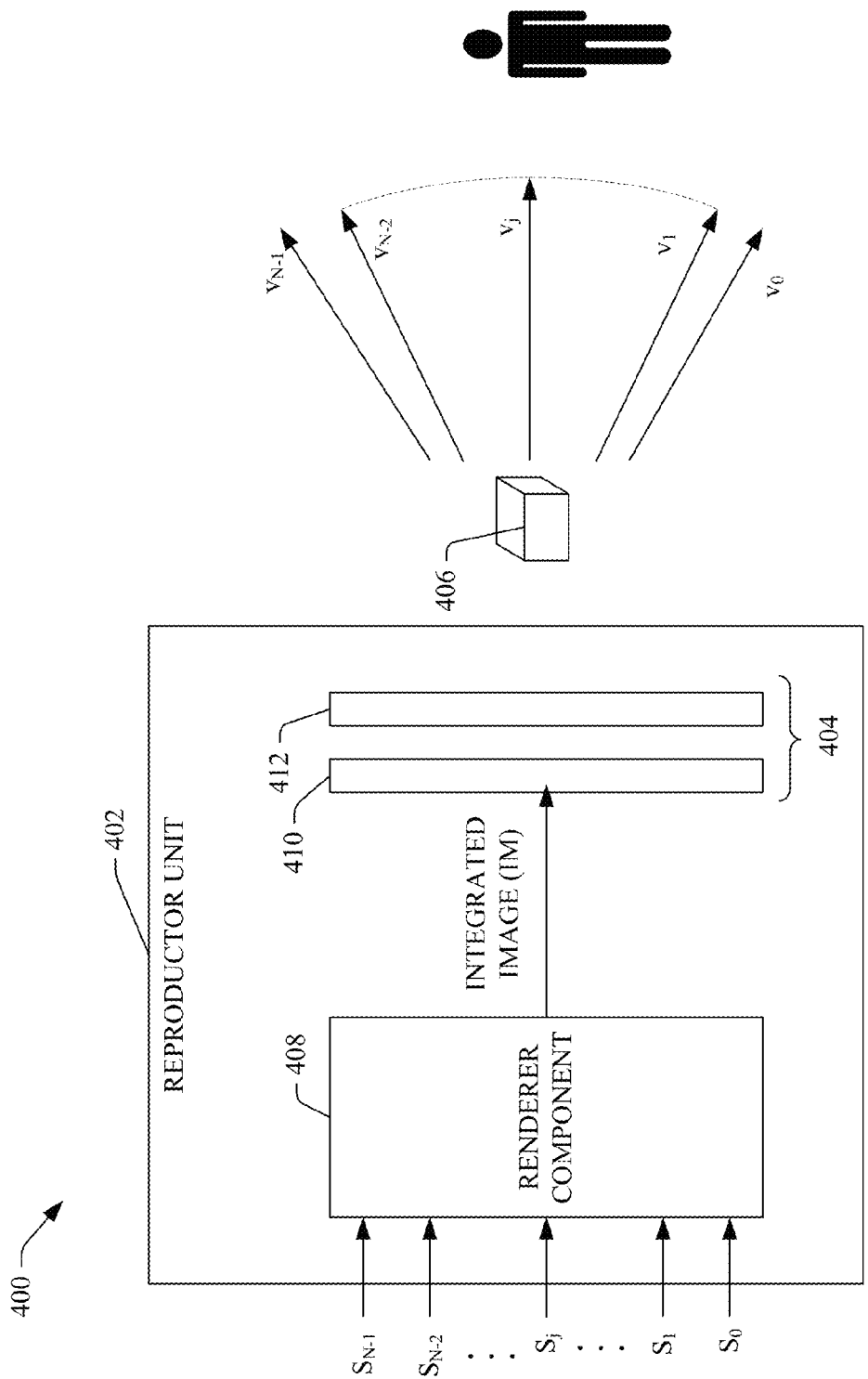
FIG. 6 illustrates a diagram of a top view of an example system for capturing a 3-D scene from multiple viewing positions to facilitate reproducing a 3-D holographic image in accordance with an aspect.

Referring briefly to FIG. 6 (along with FIG. 4), depicted is a diagram of a top view of example system 400 in accordance with an aspect. In an aspect, the display component 404 can reconstruct or reproduce the multi-view images $[v_0, v_1, \ldots, v_{N-2}, v_{N-1}]$, which can respectively correspond to the multi-view images $[S_0, S_1, \ldots, S_{N-2}, S_{N-1}]$ captured by the capture system (e.g., system 500), for display as the entire 3-D holographic image 406 in the display area where the 3-D holographic image 406 can be viewed by observers, creating a virtual perception of the original scene as captured by the capture system. While not shown in FIGS. 4 and 6 for brevity, the system 400 also can include and/or be associated with a reflector component (e.g., reflector component 112) that can be arranged at a desired angle with respect to the display component 404 to facilitate reflecting at least a desired portion of the 3-D holographic image to the display area.

It is to be appreciated and understood, that while system 400 is shown with one reproductor component 402, one renderer component 408, one display component 410, and one 3-D adapter component 412, the subject disclosure is not so limited as there can be any desired number of reproductor components 402, renderer components 408, display components 410, and 3-D adapter components 412. Further, a reproductor component 402 can have any desired number of display components 410 and 3-D adapter components 412. For example, as desired, a 3-D scene can be captured by virtually any desired number of capture components (e.g., 1, 2, 3, ..., 120, ..., 240, ..., 360, ...) from different viewing perspectives (e.g., when 360 capture components are employed, each of the capture components can be placed one degree apart from each other, for instance, forming a circle of capture components around the 3-D scene), and the captured visual information associated with the 3-D scene can be used to generate respective portions of a 3-D holographic image, and a corresponding number of display sections of the display component(s) 410 can be employed to facilitate producing and displaying the respective portions of the 3-D holographic image of the 3-D scene as an integrated 3-D holographic image in the display area. Also, while one 3-D holographic image 406 is reproduced based at least in part on a 3-D scene, the subject disclosure is not so limited as there can be more than one 3-D holographic image 406, as desired.

Figure 7:
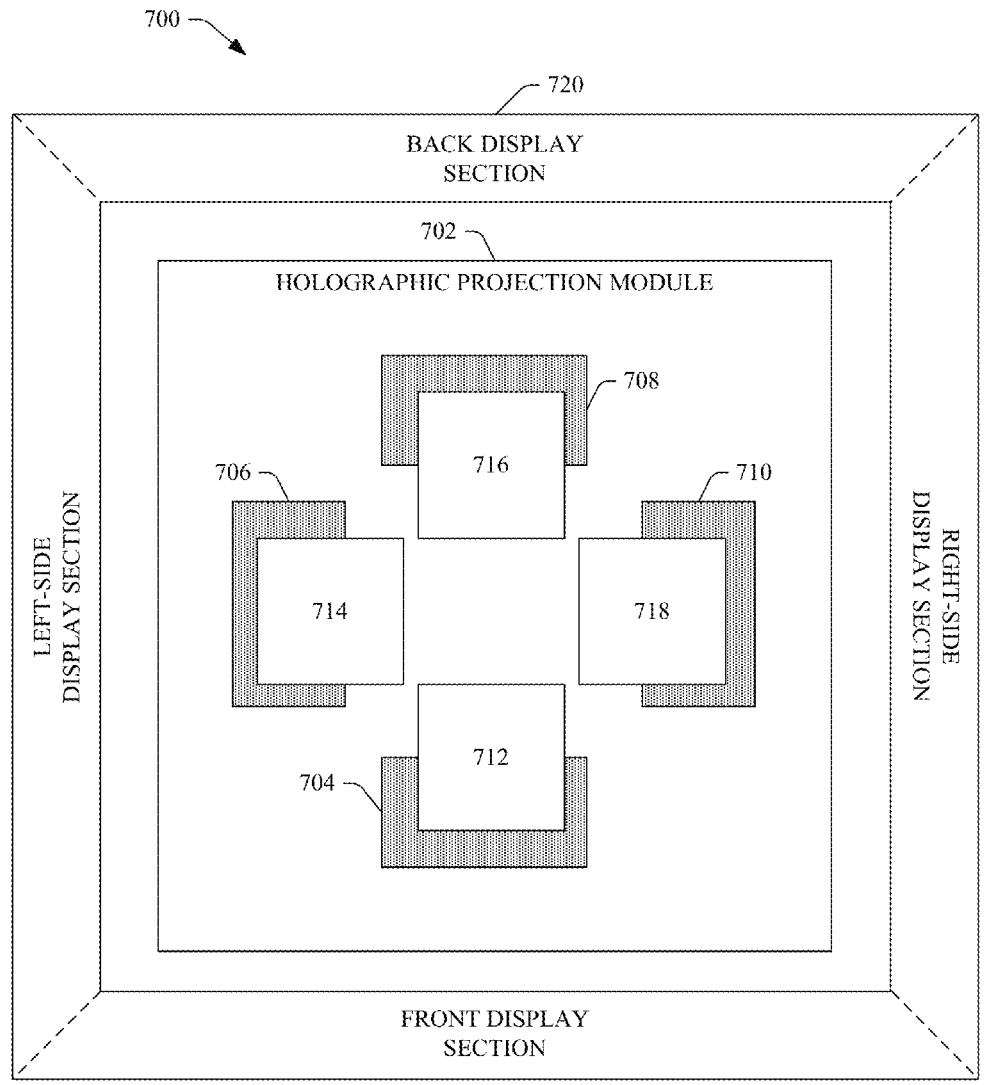
FIG. 7 depicts a diagram of a top view of an example system that can employ multiple display sections (e.g., multiple autostereoscopic displays to form an MSAD) to generate and display a multiple view 3-D holographic image of a 3-D scene in accordance with an embodiment of the disclosed subject matter.

Turning to FIG. 7, depicted is a diagram of a top view of an example system 700 that can employ multiple display sections (e.g., multiple autostereoscopic displays to form an MSAD) to generate and display a multiple view 3-D holographic image of a scene in accordance with an embodiment of the disclosed subject matter. In accordance with an embodiment, the system 700 can include an HPM 702 that can comprise a plurality of display components, such as display components 704, 706, 708 and 710, which each can be autostereoscopic displays and can form an HDS of the HPM 702. In an aspect, the plurality of display components each can include a display section and a 3-D adapter that can be adhered to the display section (not shown in FIG. 7 for reasons of clarity and brevity; e.g., as shown in FIGS. 4 and 6).

The plurality of display components, including display components 704, 706, 708 and 710, can be respectively associated with a plurality of reflector components (e.g., beam splitters), such as reflector components 712, 714, 716 and 718, that can be arranged at a desired angle (not shown due to FIG. 7 being a top view) with respect to the respective display components to reflect at least a desired portion of the respective 3-D holographic image portions that emerge from the respective display sections (via the respective 3-D adapters) of the display components 704, 706, 708 and 710 to the display area so that the 3-D holographic image can be displayed for viewing by observers. The HPM 702, plurality of display component (including display components 704, 706, 708 and 710), and plurality of reflector components (including reflector components 712, 714, 716 and 718), each can comprise the same or similar functionality or features, or at least a desired portion thereof, of respective components (e.g. respectively named components), such as more fully described herein, for example, with regard to system 100, system 200, system 300, and system 400.

As more fully disclosed herein, the HPM 702 can capture or receive visual information relating to a 3-D scene as viewed from multiple viewing perspectives (e.g., front view, left-side view, back view, and right-side view). The HPM 702 can generate the 3-D holographic image representative of the 3-D scene based at least in part on associated holographic data, wherein the 3-D holographic image can reproduce the 3-D aspects, including desired depth information and parallax information, of the 3-D scene from the multiple viewing perspectives (e.g., front view, left-side view, back view, and right-side view). Respective portions of the 3-D holographic image, which respectively correspond to the respective multiple viewing perspectives, can be displayed by the respective display components 704, 706, 708 and 710 (e.g., correspondingly front view display section, left-side view display section, back view display section, right-side view display section) (via the respective reflector components 712, 714, 716 and 718) in the display area 720, which can be in an area located outside of the HPM 702, and which can comprise, for example, a front display section, left-side display section, back display section and right-side display section that respectively can display the respective 3-D holographic image portions (e.g., front view 3-D holographic image portion, left-side view 3-D holographic image portion, back view 3-D holographic image portion, right-side view 3-D holographic image portion) projected from the HPM 702, so that the 3-D holographic image can be viewed by observers, for example, as a 3-D holographic image floating in mid-air.

It is to be appreciated and understood that the while system 700 is shown with one HPM 702, four display components 704, 706, 708 and 710, and four reflector components 712, 714, 716, and 718, the subject disclosure is not so limited, as there can be virtually any number (e.g., less than four, four, more than four) of HPMs, display components, and/or reflector components, as desired. Further, in accordance with various embodiments, the subject disclosure can comprise an HPM that comprises multiple display components (e.g., a single HPM can include four display components); and/or a single or other desired number of display components can be employed, wherein the display component(s) can comprise more than one display section, wherein each display section can display or project a respective portion of the 3-D holographic image. It is also to be appreciated and understood that the while the display components 704, 706, 708 and 710 and reflector components 712, 714, 716, and 718 are depicted as being rectangular in shape, the subject disclosure is not so limited, and the display components and reflector components can be shaped in virtually any desired shape (e.g., triangle, square, rectangle, circular, oval, irregular shape, etc.).

Figure 8:
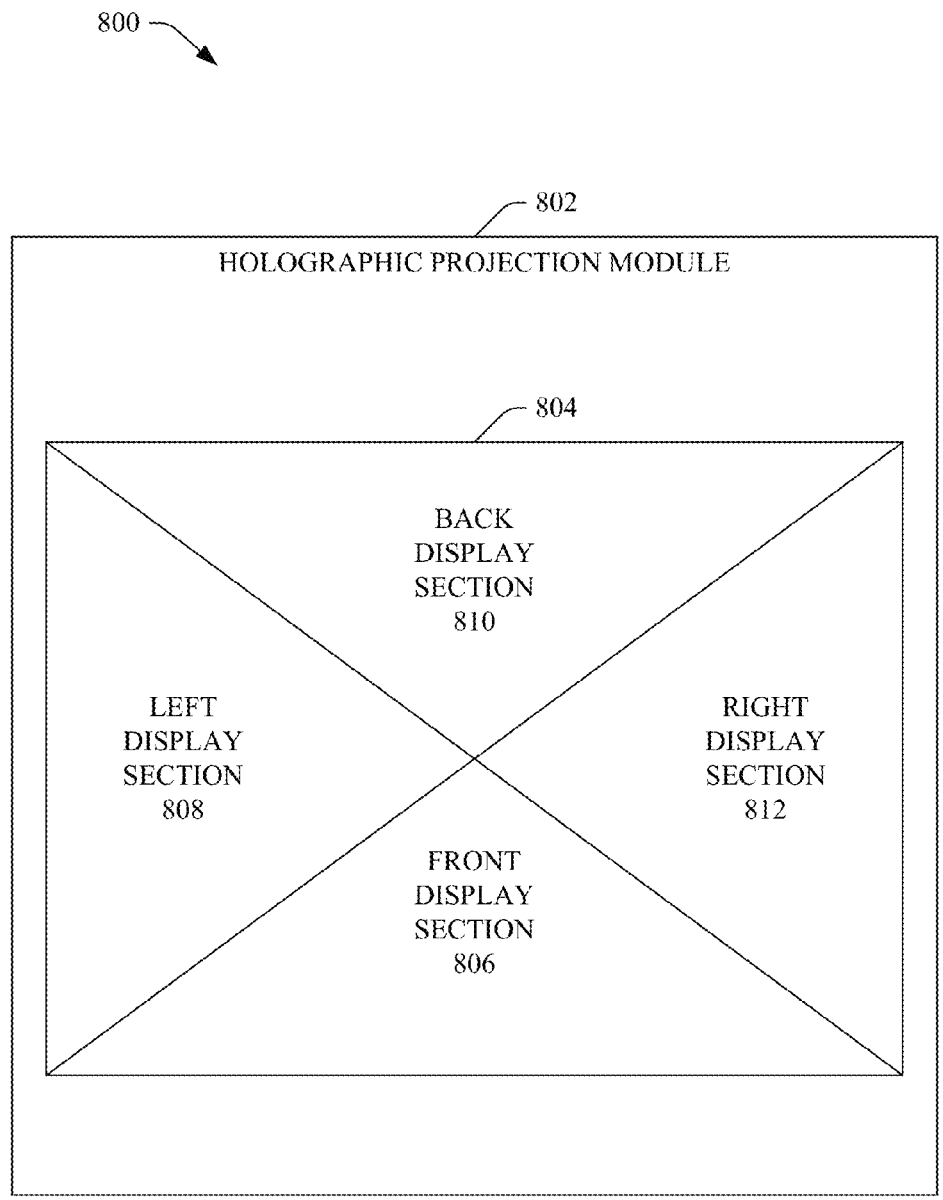
FIG. 8 illustrates a diagram of a top view of an example system that can employ multiple display sections (e.g., multiple autostereoscopic displays to form an MSAD) to generate and display a multiple view 3-D holographic image of a scene in accordance with another embodiment of the disclosed subject matter.

FIG. 8 illustrates a diagram of a top view of an example system 800 that can employ multiple display sections (e.g., multiple autostereoscopic displays to form an MSAD) to generate and display a multiple view 3-D holographic image of a scene in accordance with another embodiment of the disclosed subject matter. The system 800 can include an HPM 802 that can generate and display a 3-D holographic image based at least in part on visual information of a 3-D scene as viewed from multiple viewing perspectives. In an aspect, the HPM 802 can contain a display component 804 that can display the 3-D holographic image, which can be projected to a desired display area for viewing by observers. In an embodiment, the display component 804 can be an autostereoscopic display. The HPM 802 and the display component 804 each can comprise the same or similar functionality or features, or at least a desired portion thereof, of respective components (e.g., respectively named components), such as more fully described herein, for example, with regard to system 100, system 200, system 300, and system 400.

In an aspect, the display region (e.g., display screen) of the display component 804 (e.g., a single electronic accessible display) can be divided into a desired number of display sections, such as, for example, display sections 806, 808, 810 and 812, having a desired shape(s). For example, if four different viewing perspectives (e.g., front view, left-side view, back view, and right-side view) of a 3-D scene are to be reproduced as a 3-D holographic image, the display region of the display component 804 can be divided into four display sections (e.g., front view display section 806, left-side view display section 808, back view display section 810, right-side view display section 812) with each having a triangular shape, as depicted in FIG. 8. In this example, by partitioning or dividing the display region into four triangular-shaped contiguous display regions, the use of the display region of the display component 804 can be maximized as the entire display region can be utilized to reproduce the 3-D holographic image. It is to be appreciated and understood, however, that, as desired, the display region can be divided into display sections having different shapes (e.g., triangle, square, rectangle, pentagon, irregular shape, etc.), even if the shapes do not maximize the entire display region as long as the 3-D holographic image can be reproduced by the display component 804 (e.g., when the 3-D holographic image does not have to utilize the entire display region).

As more fully disclosed herein, the HPM 802 can capture or receive visual information relating to a 3-D scene as viewed from multiple viewing perspectives (e.g., front view, left-side view, back view, and right-side view). The HPM 802 can generate the 3-D holographic image representative of the 3-D scene based at least in part on associated holographic data, wherein the 3-D holographic image can reproduce the 3-D aspects, including desired depth information and parallax information, of the 3-D scene from the multiple viewing perspectives (e.g., front view, left-side view, back view, and right-side view). Respective portions of the 3-D holographic image, which respectively correspond to the respective multiple viewing perspectives, can be displayed by the respective display sections 806, 808, 810 and 812 (e.g., front view display section 806, left-side view display section 808, back view display section 810, right-side view display section 812) (via respective reflector components (not shown)) in the desired display area so that the 3-D holographic image can be viewed by observers, for example, as a 3-D holographic image floating in mid-air.

It is to be appreciated and understood that the while system 800 is shown with one HPM 802, one display component 804, four display sections 806, 808, 810 and 812, the subject disclosure is not so limited, as there can be virtually any desired number (e.g., one, two, three, four, more than four) of the HPMs, display components, and/or display sections, as desired. It is also to be appreciated and understood that the while the display component 804 is depicted as being rectangular in shape and the display sections 806, 808, 810 and 812 are depicted as being triangular in shape, the subject disclosure is not so limited, and the display component and display sections respectively can be shaped in virtually any desired shape (e.g., triangle, square, rectangle, circular, oval, irregular shape, etc.).

Figure 9:
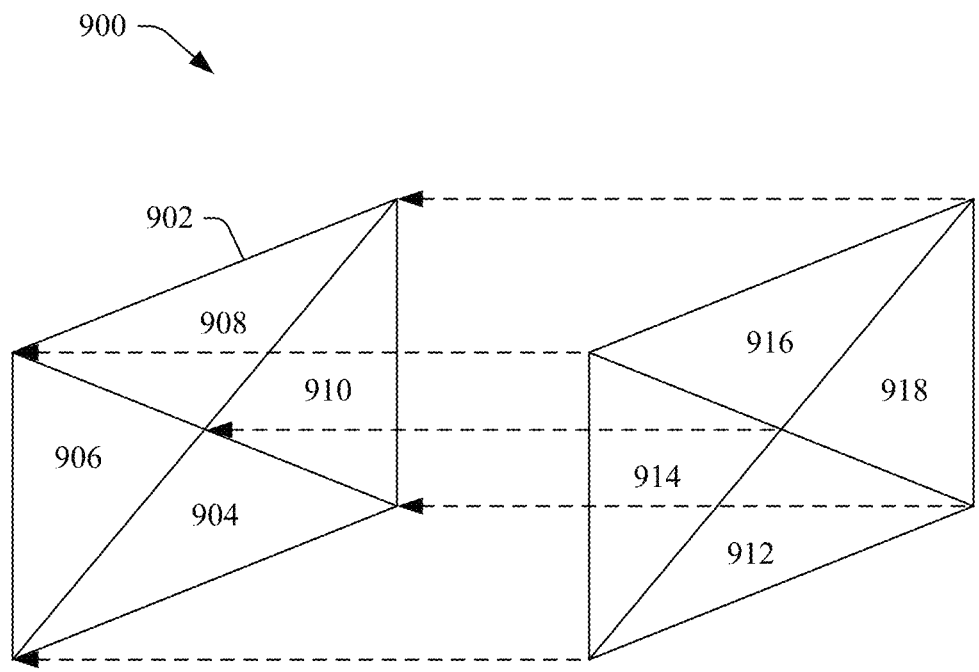
FIG. 9 illustrates a diagram of an example system that can employ multiple display sections (e.g., MSAD) to generate and display a multiple view 3-D holographic image of a 3-D scene in accordance with an embodiment of the disclosed subject matter.

FIG. 9 illustrates a diagram of an example system 900 that can employ multiple display sections (e.g., MSAD) to generate and display a multiple view 3-D holographic image of a 3-D scene in accordance with an embodiment of the disclosed subject matter. The system 900 can include a display component 902 that can display a 3-D holographic image based at least in part on a generated 3-D holographic image reproducing a 3-D scene from multiple viewing perspectives, wherein the 3-D holographic image, which has corresponding multiple viewing perspectives, can be projected to a desired display area for viewing by observers. In an embodiment, the display component 902 can be an autostereoscopic display. The display component 902 can comprise the same or similar functionality or features, or at least a desired portion thereof, of respective components (e.g., respectively named components), such as more fully described herein, for example, with regard to system 100, system 200, system 300, system 400, and system 800.

In an aspect, the display region (e.g., display screen) of the display component 902 (e.g., a single electronic accessible display) can be divided into a desired number of display sections (e.g., HDSs), such as, for example, display sections 904, 906, 908 and 910, having a desired shape(s). For example, if four different viewing perspectives (e.g., front view, left-side view, back view, and right-side view) of a 3-D scene are to be reproduced as a 3-D holographic image, the display region of the display component 902 can be divided into four display sections (e.g., front view display section 904, left-side view display section 906, back view display section 908, right-side view display section 910) with each having a triangular shape, as depicted in FIG. 9. In this example, by partitioning or dividing the display region into four triangular-shaped contiguous display regions, the use of the display region of the display component 902 can be maximized as the entire display region of the display component 902 can be utilized to reproduce the 3-D holographic image. It is to be appreciated and understood, however, that, as desired, the display region can be divided into display sections having different shapes (e.g., triangle, square, rectangle, pentagon, irregular shape, etc.), even if the shapes do not maximize the entire display region as long as the 3-D holographic image can be reproduced by the display component 902.

In another aspect, the display sections 904, 906, 908 and 910 each can have adhered thereto a respective 3-D adapter, such as 3-D adapter components 912, 914, 916 and 918. In accordance with various embodiments, the 3-D adapter components 912, 914, 916 and 918 each can be a slant or vertical lenticular lens, a slant or vertical parallax barrier, or other desired 3-D adapter.

Figure 10:
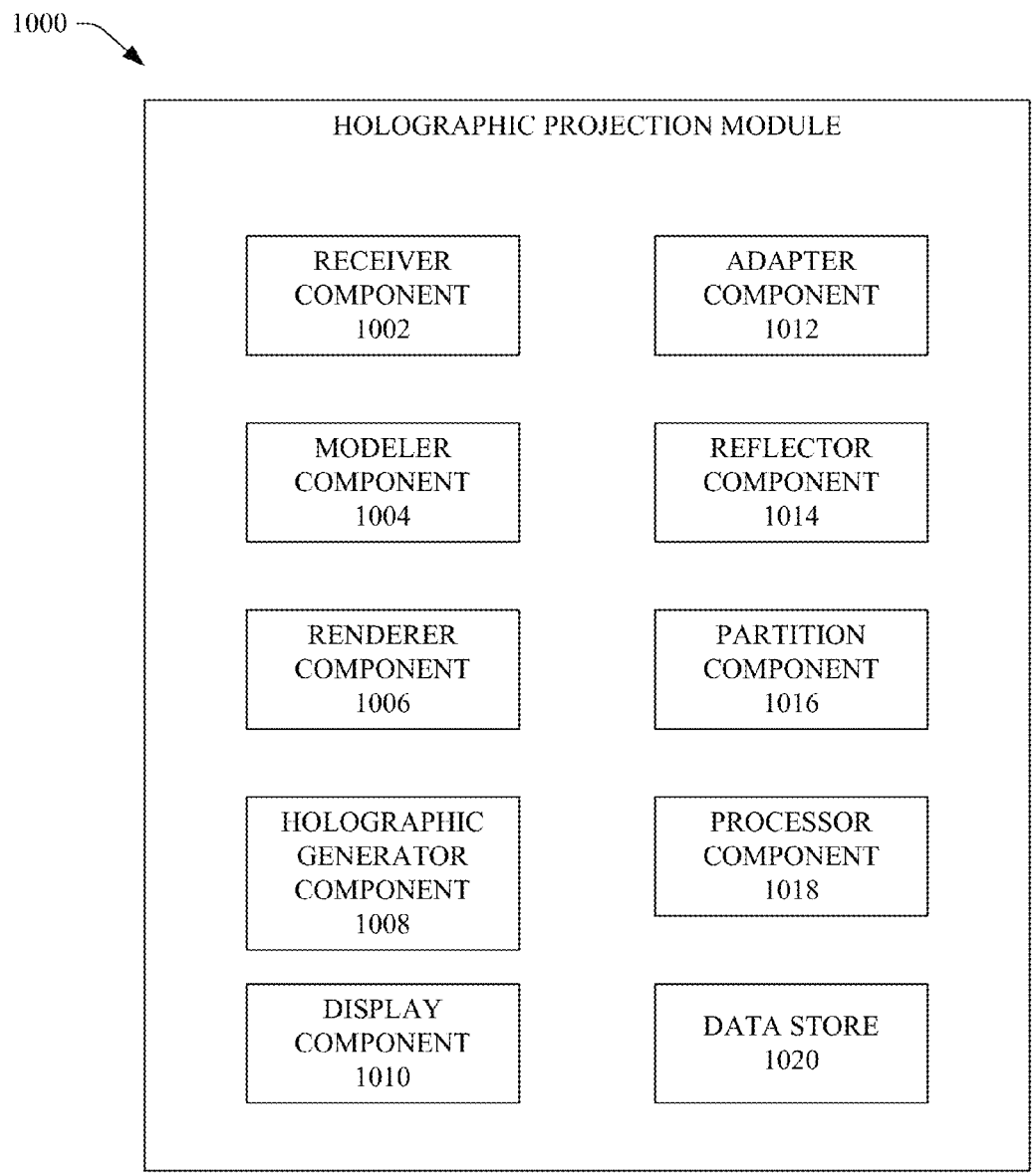
FIG. 10 depicts a block diagram of an example holographic projection module in accordance with an aspect of the disclosed subject matter.

Turning to FIG. 10, depicted is a block diagram of an example HPM 1000 in accordance with an aspect of the disclosed subject matter. In an aspect, the HPM 1000 can comprise a receiver component 1002 that can receive information, including visual information associated with a 3-D scene (e.g., real or synthetic, static or animated 3-D scene), parameter information relating to the HPM 1000 or other components associated with the HPM 1002, application information, or other information from other components associated with the HPM 1002.

The HPM 1000 also can contain a modeler component 1004 that can analyze visual information associated with a 3-D scene (e.g., respective visual information from different visual perspectives of the 3-D scene) and can generate model data that can be utilized to create or generate a 3-D model of the 3-D scene, wherein the 3-D model can be representative of the different visual perspectives of the 3-D scene. In another aspect, the HPM 1000 also can comprise a renderer component 1006 that can convert the model data associated with the 3-D scene into corresponding holographic data, which can be used to generate a 3-D holographic image that is a reproduction of the 3-D scene and is representative of the different visual perspectives of the 3-D scene. Alternatively or additionally, the renderer component 1006 can generate holographic data based at least in part on the respective visual information from the different visual perspectives of the 3-D scene to facilitate producing a 3-D holographic image representative of the 3-D scene.

In still another aspect, the modeler component 1004 and/or renderer component 1006 can operate in conjunction with a holographic generator component 1008 to facilitate generation of an off-axis 3-D holographic image of the 3-D scene, wherein the real part of the off-axis 3-D holographic image can be used to display the 3-D holographic image to a desired observer in the display area. In an aspect, an original 3-D scene can be composed of a collection of 3-D object points given by $O(x,y,z)=[o_0(x_0, y_0, z_0), o_1(x_1, y_1, z_1), \ldots, o_{N-1}(x_{N-1}, y_{N-1}, z_{N-1})]$. The holographic generator component 1008 can generate an on-axis Fresnel hologram $H_{on}(x,y)$, for example, in accordance with Equation 1, $$H_{on}(x, y) = \sum_{j=0}^{N-1} \frac{a_j}{r_j} \exp(ikr_j) \qquad (1)$$

where $k=2\pi/\lambda$, is the wave number of the laser light with $\lambda$ being the wavelength of the laser light. $a_j$ can represent the amplitude of the 'jth' object point, and $r_j = \sqrt{(x_j-x)^2+(y_k-y)^2+z_j^2}$ can be the distance between the object point $(x_j, y_j, z_j)$ and a point $(x,y)$ on the hologram. With regard to Equation (1), it is assumed the hologram is on the x-y plane (e.g., on the z=0 plane) and the object point is at a perpendicular distance $z_j$ away from the hologram. The diffraction patterns of the 3-D object is a superposition of Fresnel zone plates (FZPs) (e.g., the function $\exp(ikr_j)$) each contributed by a unique object point. The process can be interpreted as a numerical realization of holograms generated by optical scanning holography. In another aspect, in accordance with Equation (2), herein, the holographic generator component 1008 can derive or produce an off-axis hologram from $H_{on}$ (x,y) by adding a planar, or a spherical reference beam B(x,y) with certain angle of illumination as $$H(x,y) = H_{on} \cdot B(x,y). \quad (2)$$

To produce the hologram on printed media, such as a photographic film, or display the hologram on electronic accessible device, such as an SLM, the holographic generator component 1008 can facilitate retaining only the real part H'(x,y) of the hologram, in accordance with Equation (3), as given by:

$$H'(x,y) = Re[H(x,y)]. \quad (3)$$

In yet another aspect, the HPM can include a display component 1010, which can be one or more HDSs and can comprise one or more LCD displays (e.g., high resolution LCD displays), autostereoscopic displays, or other desired displays, that can be used to project or display the 3-D holographic image of the 3-D scene, wherein respective displays (e.g., HDSs) can display respective portions of the 3-D holographic image, the respective portions being reproductions of different views of the 3-D scene. In an embodiment, the display component 1010 optionally can include an adapter component 1012 (e.g., 3-D adapter component) that can be, for example, a 3-D adapter that can be utilized to adjust the 3-D holographic image displayed or provided by the display portion(s) of the display component 1010 to improve or enhance the 3-D aspects of the 3-D holographic image displayed by the display component 1010. For instance, the adapter component 1012 can be adhered or attached to the display surface of the display component 1010. In accordance with various embodiments, the adapter component 1012 can be a slant or vertical lenticular lens, a slant or vertical parallax barrier, or other desired 3-D adapter. Parameters associated with the adapter component 1012 and the display component 1010 can be adjusted to obtain the desired modification or enhancement of the 3-D holographic image by the adapter component 1012 when displayed by the display component 1010.

In accordance with another embodiment, the HPM 1000 can contain a reflector component 1014 that can reflect a 3-D holographic image (e.g., optical waves of the 3-D holographic image), or at least a desired portion thereof, to a desired display area (e.g., 3-d chamber). In an embodiment, the reflector component 1014 can be a beam splitter or other mirror type component for reflecting at least a portion of the 3-D holographic image. The reflector component 1014 can be adjusted so that the angle of the reflector component 1014 in relation to the display component 1010 is at a desired angle to facilitate reflecting the 3-D holographic image to the desired display area (e.g., display area portion thereof). Parameters associated with the reflector component 1014 and the display component 1010 can be adjusted to achieve the desired angle.

In accordance with still another embodiment, the HPM 1000 optionally can comprise a partition component 1016 that can partition or divide the display component 1010 into a desired number of display sections (e.g., HDSs) having a desired shape(s). In an aspect, the partition component 1016 can partition the display surface of the display component 1010 into distinct display sections or display regions wherein respective portions of the 3-D holographic image of respective different viewing perspectives of the 3-D scene can be displayed by the corresponding display sections of the display component 1010. The partition component 1016 can divide the display of the display component 1010 into a desired number of display sections, based at least in part on the number of different viewing perspectives of the 3-D holographic image to be displayed, and can shape the display sections so as to maximize the use of the display of the display component 1010 based at least in part on the number of display sections in which the display is to be divided. As desired, the partition component 1016 can divide the display into display sections having a shape that less than maximizes use of the display while still enabling desired display of the 3-D holographic image, and/or can divide respective display sections of a display to have a same shape or different shapes.

The HPM 1000 also can comprise a processor component 1018 that can work in conjunction with the other components (e.g., receiver component 1002, modeler component 1004, renderer component 1006, holographic generator component 1008, display component 1010, adapter component 1012, reflector component 1014, partition component 1016, etc.) to facilitate performing the various functions of the HPM 1000. The processor component 1018 can employ one or more processors, microprocessors, or controllers that can process data, such as information (e.g., visual information) relating to a 3-D scene, model data, holographic data, data relating to parameters associated with the HPM 1000 and associated components, etc., to facilitate generating and displaying a 3-D holographic image representative of a 3-D scene; and can control data flow between the HPM 1000 and other components associated with the HPM 1000.

In yet another aspect, the HPM 1000 can contain a data store 1020 that can store data structures (e.g., user data, metadata); code structure(s) (e.g., modules, objects, classes, procedures), commands, or instructions; information relating to a 3-D scene; model data; holographic data; parameter data; information relating to display of the 3-D holographic image of the 3-D scene from multiple views; and so on. In an aspect, the processor component 1018 can be functionally coupled (e.g., through a memory bus) to the data store 1020 in order to store and retrieve information desired to operate and/or confer functionality, at least in part, to the receiver component 1002, modeler component 1004, renderer component 1006, holographic generator component 1008, display component 1010, adapter component 1012, reflector component 1014, partition component 1016, and/or substantially any other operational aspects of the HPM 1000. It is to be appreciated and understood that the receiver component 1002, modeler component 1004, renderer component 1006, holographic generator component 1008, display component 1010, adapter component 1012, reflector component 1014, partition component 1016, processor component 1018, and data store 1020 each can be a stand-alone unit, can be included within the HPM 1000 (as depicted), can be incorporated within another component, and/or virtually any suitable combination thereof, as desired.

Figure 11:
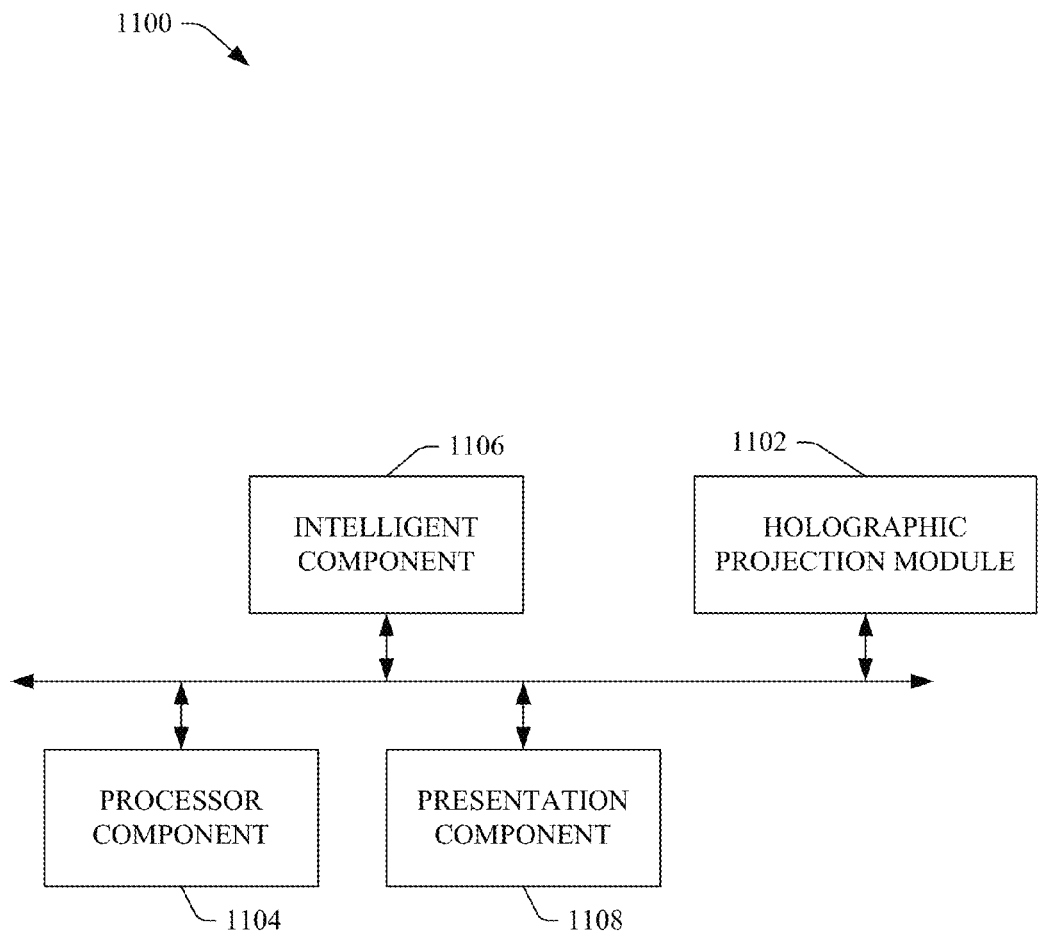
FIG. 11 illustrates a block diagram of a system that can employ intelligence to facilitate generation and display of a multiple view 3-D holographic image of a 3-D scene in accordance with an embodiment of the disclosed subject matter.

Referring to FIG. 11, depicted is a block diagram of a system 1100 that can employ intelligence to facilitate generation and display of a multiple view 3-D holographic image of a 3-D scene in accordance with an embodiment of the disclosed subject matter. System 1100 can include an HPM 1102 that can obtain visual information of multiple different viewing perspectives of a 3-D scene and can generate and display a 3-D holographic image of the 3-D scene from multiple different viewing perspectives corresponding to the multiple different viewing perspectives of a 3-D scene. It is to be appreciated that the HPM 1102 can be the same or similar as respective components (e.g., respectively named components), and/or can contain the same or similar functionality as respective components, as more fully described herein, for example, with regard to system 100, system 200, system 300, system 400, system 700, system 800, system 900, and system 1000.

The system 1100 can further include a processor component 1104 that can be associated with the HPM 1102 and/or other components (e.g., components of system 1100) via a bus. In accordance with an embodiment of the disclosed subject matter, the processor component 1104 can be a typical applications processor(s) that can manage communications and run applications. For example, the processor component 1102 can be a processor that can be utilized by a computer, mobile computing device, personal data assistant (PDA), or other electronic device. The processor component 1104 can generate commands in order to facilitate generating and displaying a 3-D holographic image of the 3-D scene from multiple different viewing perspectives corresponding to the multiple different viewing perspectives of a 3-D scene obtained by the HPM 1102, modifying parameters associated with the HPM 1102, etc.

The system 1100 also can include an intelligent component 1106 that can be associated with the HPM 1102, the processor component 1104, and/or other components associated with system 1100 to facilitate analyzing data, such as current and/or historical information, and, based at least in part on such information, can make an inference(s) and/or a determination(s) regarding, for example, generation of a 3-D holographic image based at least in part on a 3-D scene, setting of parameters associated with the HPM 1102 and associated components, dividing a display of a display component into display sections, the shape(s) of display sections of a divided display, etc.

For example, based in part on current and/or historical evidence, the intelligent component 1106 can infer that a 3-D holographic image of a 3-D scene be modified to facilitate improving or enhancing display of the 3-D holographic image, one or more parameters associated with the display component, reflector component or 3-D adapter component be adjusted to facilitate improving or enhancing display of the 3-D holographic image, etc. The intelligent component 1106 can communicate information related to the inferences and/or determinations to the HPM 1102. Based at least in part on the inference with respect to such data by the intelligent component 1106, the HPM 1102 can take (e.g., automatically or dynamically take) one or more actions to facilitate generating and displaying a 3-D holographic image of the 3-D scene from multiple different viewing perspectives corresponding to the multiple different viewing perspectives of a 3-D scene obtained by the HPM 1102, etc.

It is to be understood that the intelligent component 1106 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 1100 also can include a presentation component 1108, which can be connected with the processor component 1104. The presentation component 1108 can provide various types of user interfaces to facilitate interaction between a user and any component coupled to the processor component 1104. As depicted, the presentation component 1108 is a separate entity that can be utilized with the processor component 1104 and associated components. However, it is to be appreciated that the presentation component 1108 and/or similar view components can be incorporated into the processor component 1104 and/or a stand-alone unit. The presentation component 1108 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 1104.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the HPM 1102 and/or other components, can be situated or implemented on a single integrated-circuit chip. In accordance with another embodiment, the HPM 1102, and/or other components, can be implemented on an application-specific integrated-circuit (ASIC) chip. In yet another embodiment, the HPM 1102 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 12-15 illustrate methodologies and/or flow diagrams in accordance with the disclosed subject matter. For simplicity of explanation, the methodologies are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 12:
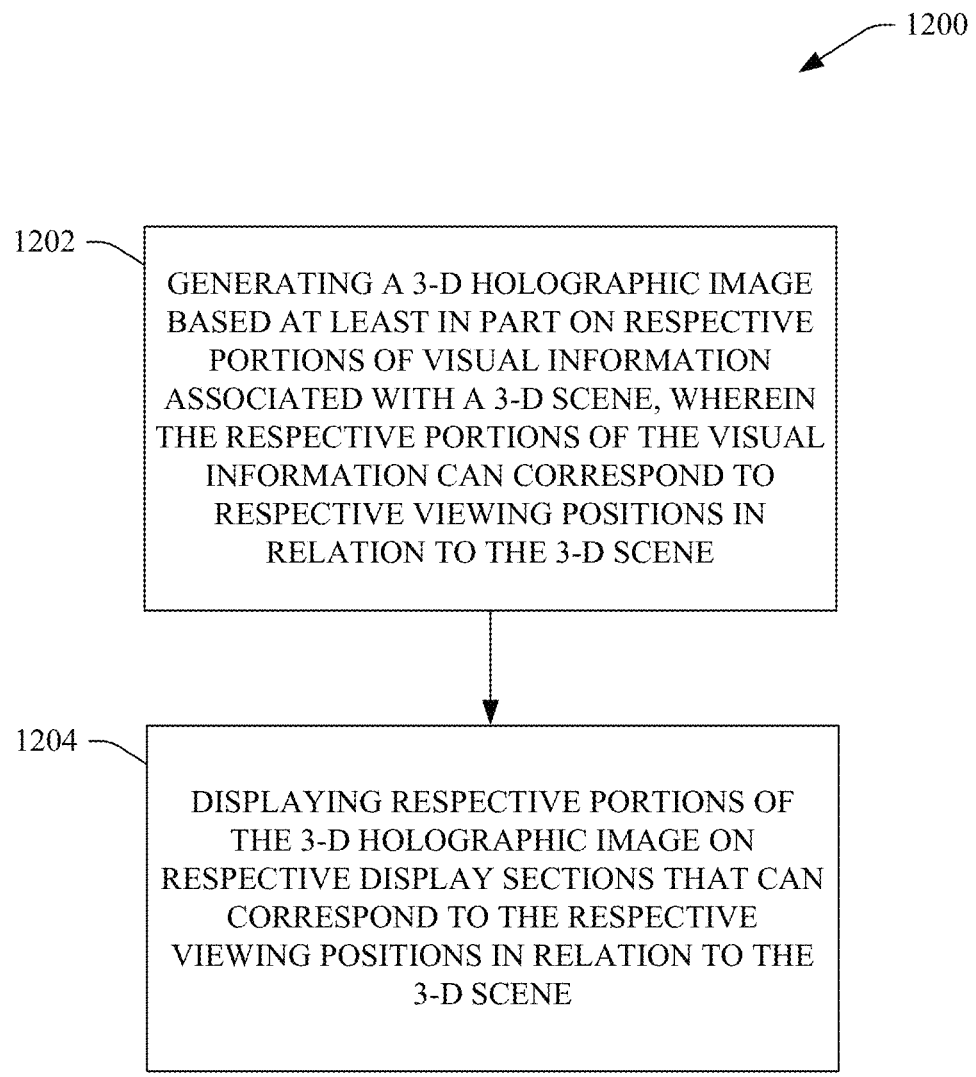
FIG. 12 illustrates a methodology that can display a multi-viewable 3-D holographic image of a 3-D scene in accordance with various embodiments and aspects of the disclosed subject matter.

Referring to FIG. 12, an example methodology 1200 that can display a multi-viewable 3-D holographic image of a 3-D scene in accordance with various embodiments and aspects of the disclosed subject matter is illustrated. At 1202, a 3-D holographic image can be generated based at least in part on (e.g., as a function of) respective portions of visual information associated with a 3-D scene, wherein the respective portions of the visual information can correspond to respective viewing positions in relation to the 3-D scene. In an aspect, the 3-D holographic image can be generated based at least in part on respective portions of visual information of respective multiple viewing perspectives of the 3-D scene, wherein the 3-D scene can be real or synthetic, static or animated. For instance, with regard to a real 3-D scene, a desired number of capture components (e.g., four capture components) can view the 3-D scene from different viewing positions (e.g., front view, left-side view, back view, right-side view, . . . ) and each capture component can capture optical waves scattered by the 3-D scene from the respective viewing position of that capture component. An HPM can analyze the respective portions of visual information associated with the 3-D scene and can generate a 3-D holographic image reproducing the 3-D scene from the multiple viewing perspectives.

At 1204, respective portions of the 3-D holographic image can be displayed on respective display sections that can correspond to the respective viewing positions in relation to the 3-D scene. In an aspect, the HPM(s) can comprise a desired number of display sections, wherein, for example, the number of display sections (e.g., HDSs) can correspond to the number of different viewing positions that were used to obtain the respective portions of the visual information associated with the 3-D scene. In accordance with various embodiments, the number of display sections can be on a corresponding number of display components or the number of display sections can be on a single display component having a display region divided into the desired number of display sections, wherein the display sections have a desired shape. In accordance with certain embodiments, the display sections can have a 3-D adapter component adhered thereto. In accordance to certain embodiments, respective display sections can be associated with respective reflector components that can be arranged with respect to the respective display sections to reflect at least a desired portion of the 3-D holographic image, which was projected by the display sections to the reflector components, to the display area.

Figure 13:
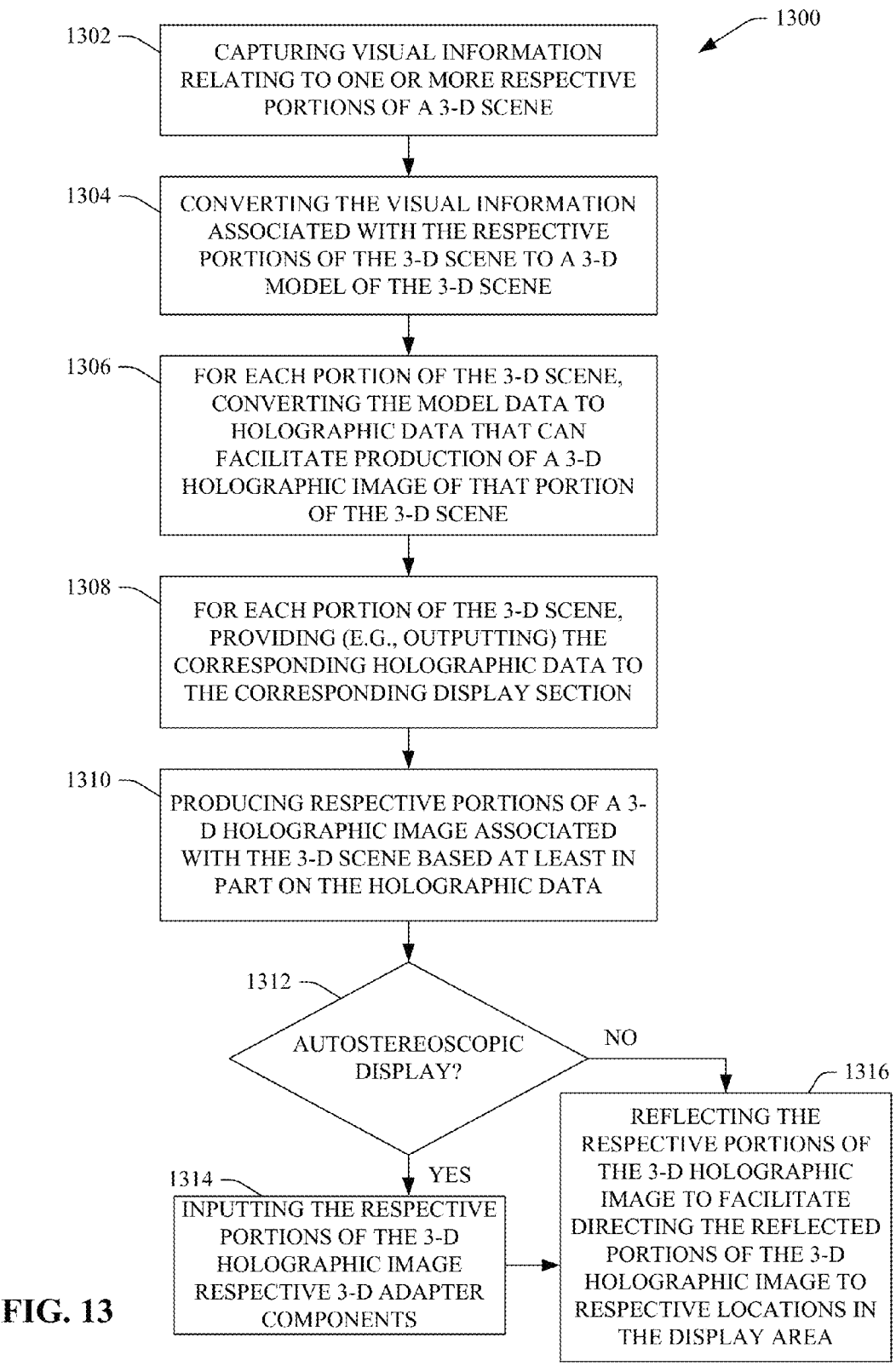
FIG. 13 depicts another example methodology that can display a multi-viewable 3-D holographic image of a scene in accordance with an aspect of the disclosed subject matter.

Turning to FIG. 13, illustrated is another example methodology 1300 that can display a multi-viewable 3-D holographic image of a 3-D scene in accordance with an aspect of the disclosed subject matter. At 1302, visual information relating to one or more respective portions of a 3-D scene (e.g., static or animated 3-D scene, which can be real or synthetic and can comprise a real or synthetic object(s)) can be captured. In an aspect, when the scene is real, a desired number of capture components (e.g., camera array or other visual detectors) can be aimed at respective portions of the 3-D scene and can capture visual information representative of the respective portions of the 3-D scene. For instance, respective optical waves reflected off the respective portions of the 3-D scene can be detected and captured as respective visual information by the respective capture components to facilitate capturing the 3-D scene from desired viewing perspectives to facilitate generation and display of a multi-view 3-D holographic image representative of the 3-D scene. In another aspect, when the 3-D scene is synthetic, visual information can be generated to synthesize or simulate the 3-D scene from various desired visual perspectives (e.g., various desired angles with respect to the 3-D scene), wherein respective portions of the visual information can relate to respective viewing perspectives and portions of the synthetic 3-D scene. It is to be appreciated and understood that a 3-D scene also can be comprised both of a real portion(s) and a synthetic portion(s), as desired.

At 1304, the captured visual information associated with the respective portions of the 3-D scene can be converted to a 3-D model of the 3-D scene. For instance, for each portion of the 3-D scene, the visual information can be converted to model data that can facilitate reproduction of that portion of the 3-D scene in 3-D. At 1306, for each portion (e.g., corresponding to a respective viewing perspective) of the 3-D scene, the model data can be converted to holographic data that can facilitate production of a 3-D holographic image of that portion of the 3-D scene.

At 1308, for each portion of the 3-D scene, the corresponding holographic data can be provided (e.g., output) to the corresponding display section. In an aspect, respective portions of the holographic data associated with respective portions of the 3-D scene can be provided to respective display sections of a display component(s) (e.g., respective display sections of a single display component, respective display sections of multiple display components, respective display sections of a MSAD, etc.)

At 1310, respective portions of a 3-D holographic image associated with (e.g., representative of) the 3-D scene can be produced based at least in part on the holographic data. In an aspect, the respective portions of holographic data can be used to produce the respective portions of the 3-D holographic image in the respective display sections, where the respective portions of the 3-D holographic image can be output (e.g., displayed) from the respective display sections as respective optical waves relating to the 3-D holographic image.

At this point, methodology 1300 can proceed to reference point 1312, where methodology 1300 can proceed differently depending in part on the type of display component employed. For instance, when the display component is an autostereoscopic display or an MSAD, at 1314, the respective portions of the 3-D holographic image (e.g., respective optical waves of the respective portions of the 3-D holographic image) can be projected through (e.g., input to) respective 3-D adapter components to respective locations in the display area. In an aspect, the respective portions of the 3-D holographic image can be provided to respective 3-D adapter components, where the respective portions can be desirably modified (e.g., enhanced with regard to 3-D aspects), and output from the respective 3-D adapter components to respective locations in the display area to facilitate integrating the respective portions as an entire 3-D holographic image in the display area for viewing by observers. At this point, methodology 1300 can proceed to reference point 1316.

Referring again to reference point 1312, when the display component has multiple display sections or there are multiple display components for multiple display sections and the multiple display sections are not associated with an autostereoscopic display or MSAD, such as, for example, when the display component comprises an SLM or a high resolution LCD, methodology 1300 can proceed from reference point 1312 to reference point 1316.

At 1316, the respective portions of the 3-D holographic image (e.g., respective optical waves of the respective portions of the 3-D holographic image) can be reflected (e.g., partially reflected, as desired) off respective reflector components (e.g., beam splitters) to facilitate directing the reflected portions of the 3-D holographic image to respective locations in the display area. For instance, the reflected portions of the 3-D holographic image can be desirably reflected in desired directions to respective locations in the display area to facilitate integrating the respective portions as an entire 3-D holographic image in the display area for viewing by observers. For each reflector component, the respective reflector component can be desirably angled in relation to the corresponding display section and corresponding location in the display area to facilitate accurately displaying the respective portion of the 3-D holographic image.

Figure 14:
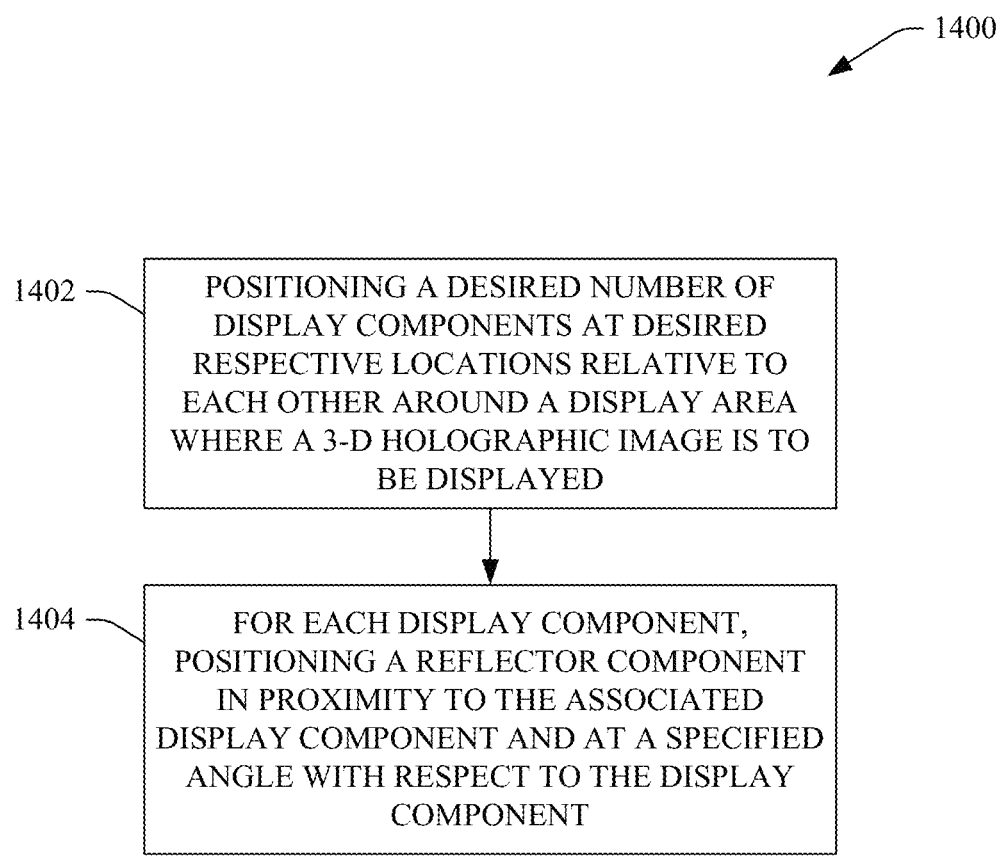
FIG. 14 depicts an example methodology for constructing a multiple view aerial holographic projection system (MVAHPS) in accordance with an embodiment of the disclosed subject matter.

FIG. 14 depicts an example methodology 1400 for constructing a MVAHPS in accordance with an embodiment of the disclosed subject matter. At 1402, a desired number (e.g., 2, 3, 4, or more) of display components can be positioned at desired respective locations relative to each other around a display area where a 3-D holographic image of a real or synthetic scene and/or object(s) is to be displayed. As one example, there can be four display components positioned at the front, left side, back, and right side of the display area to facilitate projection and display of the 3-D holographic image in the display area. In an aspect, one or more HPMs each can comprise one or more of the display components. In another aspect, all or at least a desired portion of the display components can be or can include an autostereoscopic display, a SLM, or media (e.g., static media, such as photographic film), wherein each display component is configured to display a respective portion of the 3-D holographic image, which can correspond to the location of the display component with respect to the display area, in proximity to other portions of the 3-D holographic image in the display area to form the entire 3-D holographic image. In an embodiment, when the display component is an autostereoscopic display, it can have attached thereto or can comprise a 3-D adapter, which can facilitate enhanced or improved display of the portion of the 3-D holographic image displayed by the autostereoscopic display. In accordance with other embodiments, when the display component(s) includes an SLM or media, each such display component can produce an off-axis hologram of the portion of the 3-D holographic image associated with that display component.

In accordance with an aspect, when the 3-D scene to be projected as a 3-D holographic image is a real 3-D scene, a desired number of capture components (e.g., cameras) can be employed and positioned at desired locations around the real 3-D scene, wherein each of the capture components can capture visual information relating to the portion of the real 3-D scene on which the particular capture component has its lens or visual detector focused. A renderer component can be employed to receive the respective visual information (e.g., information relating to optical waves scattered off of the 3-D scene as perceived from multiple viewing positions around and/or relative to the 3-D scene) from the respective capture components and can render the respective visual information to convert the respective visual information into respective portions of the 3-D holographic image (e.g., respective portions of holographic data corresponding to respective portions of the 3-D holographic image), wherein the respective portions of the 3-D holographic image can be provided (e.g., output) to the corresponding display components to facilitate display of the 3-D holographic image.

In another aspect, when the scene to be projected as a 3-D holographic image is a synthetic scene, a synthesizer component can be employed to generate model data representing a 3-D model of the synthetic scene. A holographic generator component or renderer component can be employed to convert the model data to holographic data and divide the holographic data into respective portions that can respectively correspond to the different portions of the 3-D holographic image to be displayed by the respective display components. Alternatively or additionally, the synthesizer component can divide the model data into respective portions that can correspond to the respective portions of the 3-D model that is to be holographically reproduced, and the holographic generator component or renderer component can convert the respective portions of model data to respective portions of holographic data that can respectively correspond to the different portions of the 3-D holographic image to be displayed by the respective display components.

At 1404, for each display component, a reflector component (e.g., beam splitter) can be positioned in proximity to the associated display component and at a specified angle with respect to the display component so that the portion of the 3-D holographic image projected by that display component can be reflected (e.g., partially reflected, as desired) off of the reflector component to a desired position or location in the display area in proximity to the other portions of the 3-D holographic image to facilitate display of the entire 3-D holographic image. For example, when four display components are positioned at the front, left side, back, and right side of the display area, the four reflector components respectively associated with the four display components can be angled in relation to the respective display components and the display area such that the four respective portions (e.g., front portion, left side portion, back portion, right side portion) of the 3-D holographic image (e.g., respective portions of the optical waves respectively representing respective portions of the 3-D holographic image) received by the respective reflector components from the respective display components can be reflected (e.g., partially reflected, as desired) off the respective reflector components to the display area such that the respective portions of the 3-D holographic image can be integrated in the display area as a whole 3-D holographic image for viewing by the observer. In an aspect, as desired, the display area can be such that the 3-D holographic image is floating, or at least appears to be floating, in mid-air.

Figure 15:
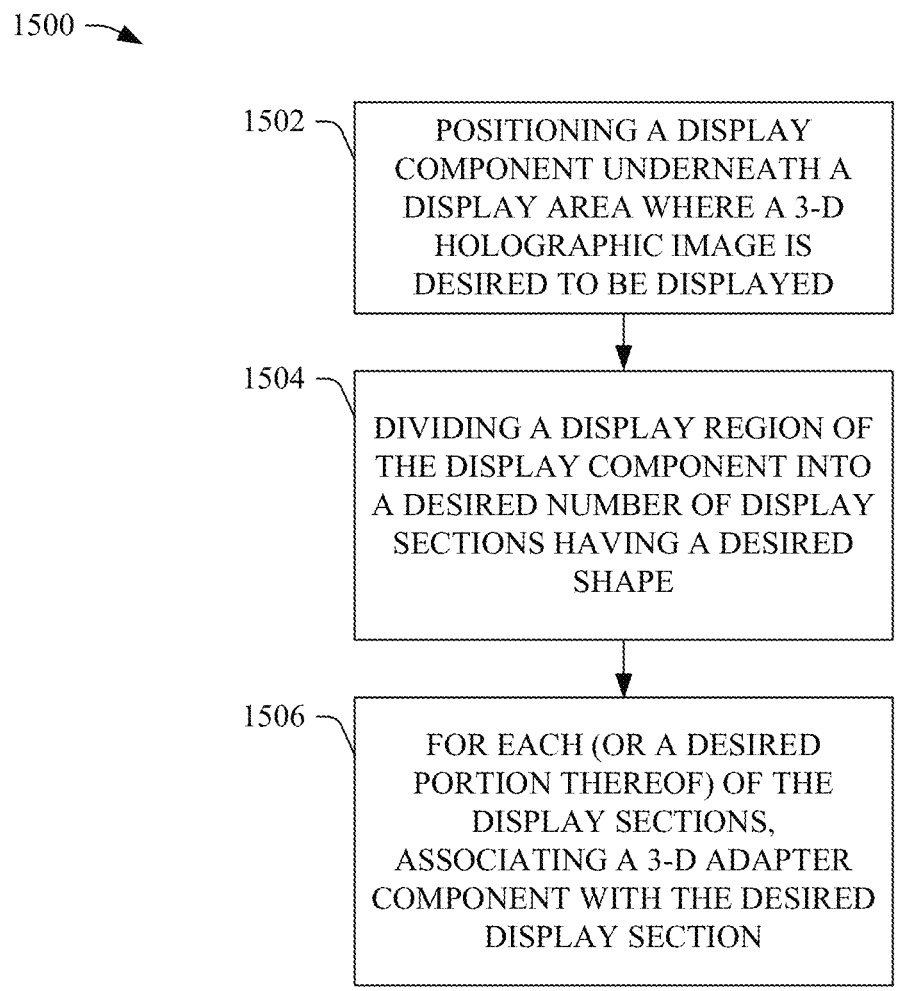
FIG. 15 illustrates an example methodology for constructing at least a portion of an MVAHPS in accordance with another embodiment of the disclosed subject matter.

FIG. 15 illustrates an example methodology 1500 for constructing at least a portion of an MVAHPS in accordance with another embodiment of the disclosed subject matter. At 1502, a display component can be positioned underneath a display area where a 3-D holographic image is desired to be displayed. In an aspect, the display component can be employed in the MVAHPS, wherein the display component can be an autostereoscopic display, such as an MSAD. In another aspect, a display region from which the 3-D holographic image will emanate can be facing up, but underneath, the display area, as the display component lies horizontally (or at another desired position or angle), for example, on a surface (e.g., floor) or is propped (e.g., with legs or a stand of desired height) on the surface.

At 1504, the display component can have its display region (e.g., display screen) divided into a desired number of display sections (e.g., HDSs) having a desired shape. The display region of the autostereoscopic display can be divided into a desired number of display sections (e.g., four display sections) each having a desired shape (e.g., triangular shape). The shape of the display sections can be based at least in part on the number of display sections in which the display region is divided and the shape of the display region as a whole. For example, when a rectangular or square shaped display region of an autostereoscopic display is divided into four display sections, a desired shape for each display section can be triangular, as the four triangular display sections can be contiguous with each other in the display region to facilitate use of the entire display region, although it is to be understood that other shapes can be employed for the display sections that can result in less than the entire display region being available for use in projecting the 3-D holographic image, while still having enough of the display region available to project the desired 3-D holographic image (that is, in certain instances, it may not be necessary to have the entire display region available in order to display a particular 3-D holographic image, and dividing the display region into multiple display sections shaped such that the 3-D holographic image can be displayed as desired, even though the entire display region is not available to display the 3-D holographic image).

At 1506, for each (or a desired portion thereof) of the display sections, a 3-D adapter component can be associated with (e.g., adhered or attached to) the desired display section. In an aspect, a 3-D adapter, such as a slant or vertical lenticular lens, or a slant or vertical parallax barrier, can be associated with a respective display section, for all or at least a desired portion of the display sections, to facilitate improving or enhancing the 3-D aspects of the 3-D holographic image when displayed in the display area. The respective display sections also can be associated with respective reflector components that can reflect at least a desired portion of the respective 3-D holographic image portions from the respective display sections so that the respective 3-D holographic image portions are displayed in a desired display area. The respective display sections can emit respective optical waves associated with respective portions of the 3-D holographic image via respective 3-D adapters to the respective reflector components, which can reflect the respective 3-D holographic image portions to the display area, where the respective portions of the 3-D holographic image can be integrated together to form the whole 3-D holographic image of the scene for viewing by an observer(s) observing the display area.

Figure 16:
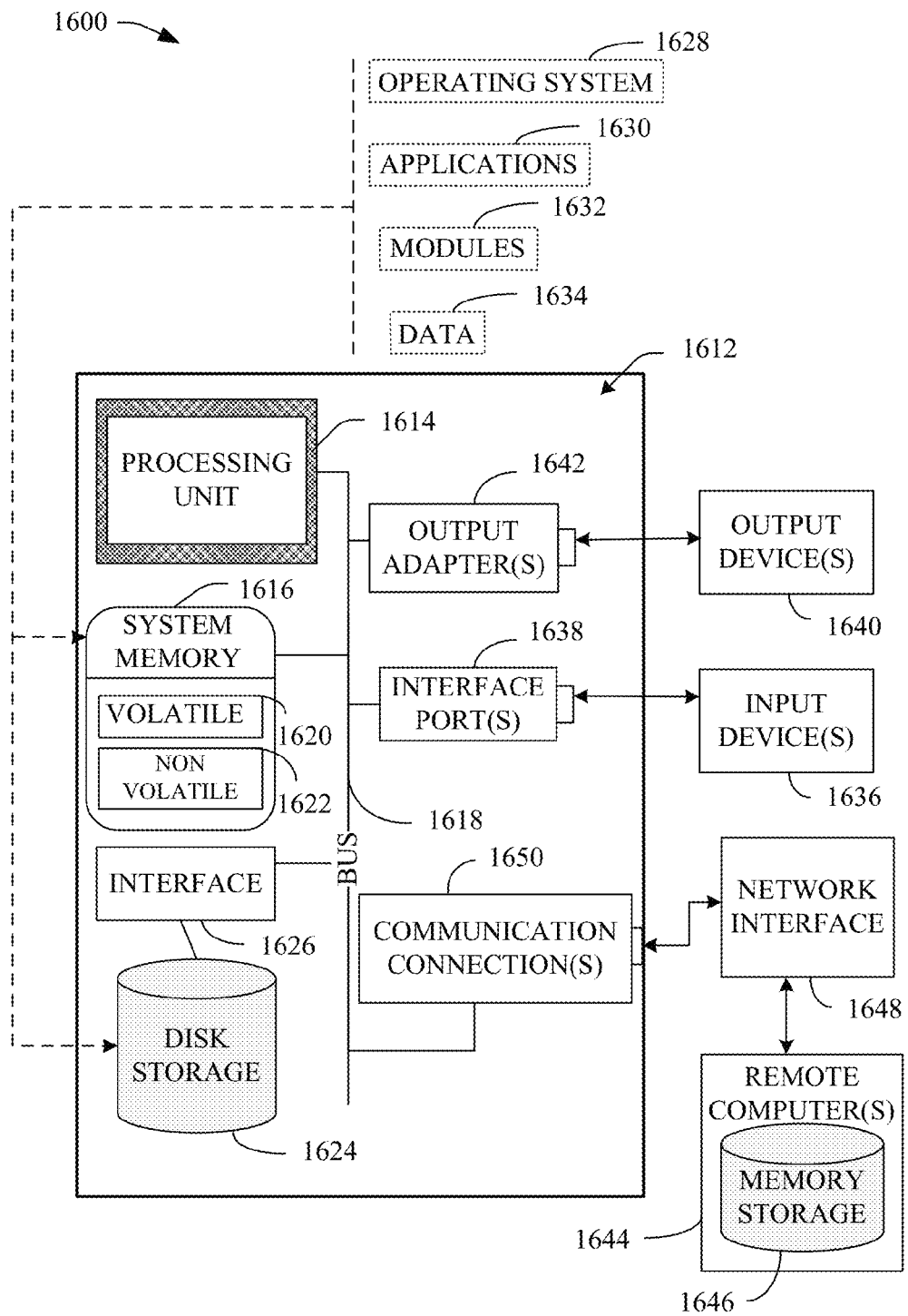
FIG. 16 is a schematic block diagram illustrating a suitable operating environment.
Figure 17:
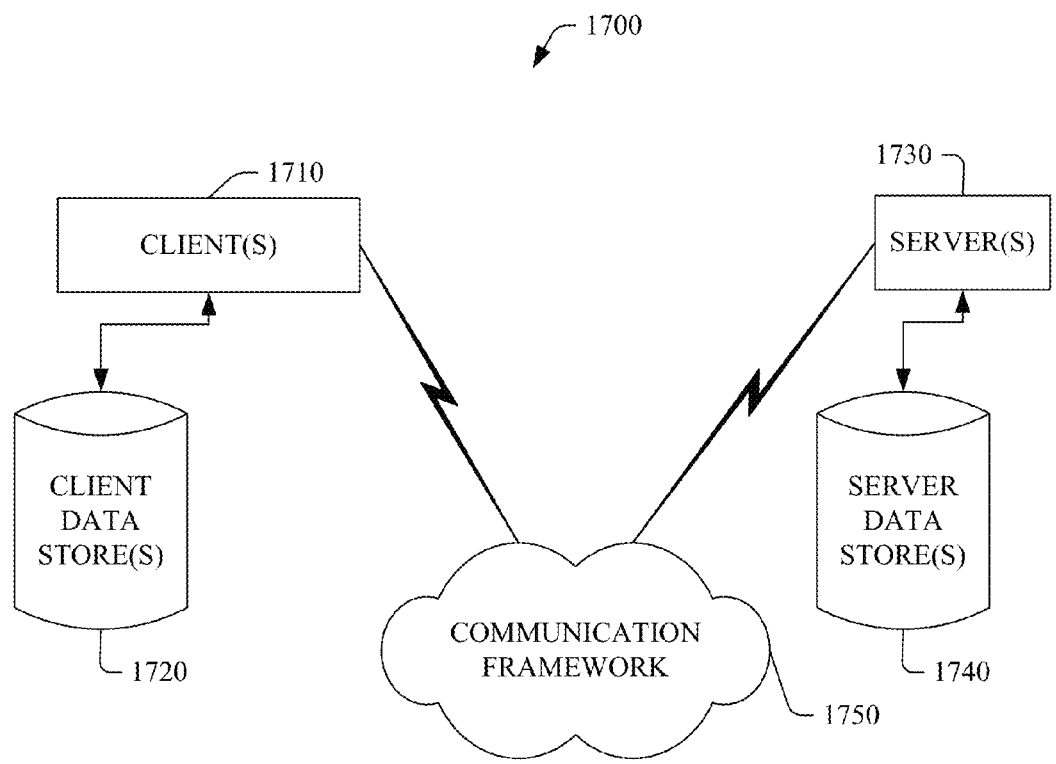
FIG. 17 is a schematic block diagram of a sample-computing environment.

In order to provide a context for the various aspects of the disclosed subject matter, FIGS. 16 and 17 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 16, a suitable environment 1600 for implementing various aspects of the claimed subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable programmable ROM (EEPROM), or flash memory. Volatile memory 1620 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1612 also includes removable/non-removable, volatile/non-volatile computer storage media. FIG. 16 illustrates, for example, a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used, such as interface 1626).

It is to be appreciated that FIG. 16 describes software that acts as an intermediary between users and the basic computer resources described in the suitable operating environment 1600. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the claimed subject matter can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample-computing environment 1700 with which the subject disclosure can interact. The system 1700 includes one or more client(s) 1710. The client(s) 1710 can be hardware and/or software (e.g., threads, processes, computing devices). The system 1700 also includes one or more server(s) 1730. Thus, system 1700 can correspond to a two-tier client server model or a multi-tier model (e.g., client, middle tier server, data server), amongst other models. The server(s) 1730 can also be hardware and/or software (e.g., threads, processes, computing devices). The servers 1730 can house threads to perform transformations by employing the subject disclosure, for example. One possible communication between a client 1710 and a server 1730 may be in the form of a data packet transmitted between two or more computer processes.

The system 1700 includes a communication framework 1750 that can be employed to facilitate communications between the client(s) 1710 and the server(s) 1730. The client(s) 1710 are operatively connected to one or more client data store(s) 1720 that can be employed to store information local to the client(s) 1710. Similarly, the server(s) 1730 are operatively connected to one or more server data store(s) 1740 that can be employed to store information local to the servers 1730.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
a processor, coupled to a memory, that facilitates execution of computer-executable components, comprising:
a holographic projection module that captures visual information associated with a three-dimensional scene, wherein the visual information comprises optical waves that are scattered by the three-dimensional scene and captured by the holographic projection module, and wherein the optical waves, at least in part, comprise three-dimensional depth of the three-dimensional scene represented as depth information and parallax of the three-dimensional scene represented as parallax information;
a reproductor component coupled to the holographic projection module, wherein the reproductor component generates a three-dimensional holographic image that reproduces the optical waves of the three-dimensional scene as reproduced optical waves, including reproduction of the depth information and the parallax information of the optical waves associated with the three-dimensional scene to reproduce the three-dimensional depth and the parallax of the three-dimensional scene, based at least in part on respective portions of the visual information associated with the three-dimensional scene, wherein the respective portions of the visual information correspond to respective viewing perspectives of the three-dimensional scene, and wherein the depth information comprises holographic information that facilitates presentation of the three-dimensional depth with respect to the respective viewing perspectives by the three-dimensional holographic image; and
at least one display component that comprises a specified number of respective display sections based at least in part on a number of the respective viewing perspectives of the three-dimensional scene, wherein the respective display sections display respective portions of the three-dimensional holographic image that correspond to the respective viewing perspectives of the three-dimensional scene, wherein a reproduced optical wave of the reproduced optical waves is determined along a viewing position that corresponds to a viewing perspective of the respective viewing perspectives to reproduce an optical wave of the optical waves that is scattered by the three-dimensional scene along the viewing perspective to facilitate preservation of the depth information and the parallax information of the three-dimensional scene in the three-dimensional holographic image, wherein the at least one display component comprises an autostereoscopic display comprising a display screen that is partitioned into at least four display sections having a specified shape, wherein the specified shape is selected such that a display area of the at least four display sections is maximized, wherein the at least four display sections are contiguous, with each display section of the at least four display sections having a triangular shape, and wherein the at least four display sections comprise a first display section, a second display section, a third display section, and a fourth display section, with a first side of the first display section being associated with a side of the second display section, a second side of the first display section being associated with a side of the third display section, and a point of the first display section formed from a connection of the first side to the second side being associated with a point of the fourth display section formed from a connection of two sides of the fourth display section to each other.

2. The system of claim 1, wherein the reproductor component is further configured to capture or receive the respective portions of the visual information and generate model data, comprising a subset of model data representative of the depth information and the parallax information, to facilitate generation of a three-dimensional model of the three-dimensional scene; and configured to convert the model data to holographic data, comprising a subset of holographic data representative of the depth information and the parallax information, to facilitate the generation of the three-dimensional holographic image.

3. The system of claim 1, wherein the reproductor component is further configured to reproduce a three-dimensional depth portion and a parallax portion of the optical waves of the three-dimensional scene, based at least in part on the optical waves captured by the holographic projection module, to facilitate the preservation of the depth information and the parallax information, comprising horizontal parallax information and vertical parallax information, associated with the three-dimensional scene in the three-dimensional holographic image, wherein the depth information comprises the three-dimensional depth portion of the optical waves scattered by the three-dimensional scene and the parallax information comprises the parallax portion of the optical waves, and wherein the horizontal parallax information and the vertical parallax information comprises three-dimensional holographic information that facilitates presentation of three-dimensional parallax with respect to the respective viewing perspectives of the three-dimensional holographic image.

4. The system of claim 1, wherein the at least one display component comprises at least one of a liquid crystal display, a spatial light modulator, or the autostereoscopic display, wherein the at least one display component displays the three-dimensional holographic image in at least one of monochrome or color.

5. The system of claim 1, wherein the reproductor component is configured to generate the three-dimensional holographic image as an off-axis hologram, wherein the at least one display component comprises at least one spatial light modulator that displays the off-axis hologram.

6. The system of claim 1, wherein the at least one display component facilitates integration of the respective portions of the three-dimensional holographic image that correspond to the respective viewing perspectives of the three-dimensional scene to present the respective portions of the three-dimensional holographic image as a single integrated three-dimensional holographic image.

7. The system of claim 1, wherein the computer-executable components further comprise a specified number of three-dimensional adapter components that are respectively adhered to the respective display sections, wherein the three-dimensional adapter components modify the respective portions of the three-dimensional holographic image to enhance the respective portions of the three-dimensional holographic image, and wherein the three-dimensional adapter components are at least one of a slant or vertical lenticular lens, or a slant or vertical parallax barrier.

8. The system of claim 1, wherein the three-dimensional scene comprising at least one of a real scene or a synthetic scene that is at least one of static or animated.

9. The system of claim 1, wherein the computer-executable components further comprise a specified number of respective reflector components that reflect at least a portion of the respective portions of the three-dimensional holographic image to display the three-dimensional holographic image in the display area to facilitate viewing of the three-dimensional holographic image by at least one observer, wherein different visual perspectives of the three-dimensional image are perceivable by the at least one observer as the at least one observer changes viewing perspective in relation to the three-dimensional holographic image.

10. The system of claim 6, wherein the respective portions of the three-dimensional holographic image comprise a first portion, a second portion, a third portion, and a fourth portion of the three-dimensional holographic image, and wherein the at least one display component reproduces a first portion of the optical waves associated with a first viewing perspective of the three-dimensional scene to facilitate presenting the first portion of the three-dimensional holographic image, a second portion of the optical waves associated with a second viewing perspective of the three-dimensional scene to facilitate presenting the second portion of the three-dimensional holographic image, a third portion of the optical waves associated with a third viewing perspective of the three-dimensional scene to facilitate presenting the third portion of the three-dimensional holographic image, and a fourth portion of the optical waves associated with a fourth viewing perspective of the three-dimensional scene to facilitate presenting the fourth portion of the three-dimensional holographic image.

11. A method, comprising:
receiving, by a system comprising a processor, visual information associated with a three-dimensional scene, wherein the visual information comprises optical waves that are scattered by the three-dimensional scene, and wherein the optical waves, at least in part, comprise three-dimensional depth of the three-dimensional scene represented as depth information and disparity of the three-dimensional scene represented as disparity information;
generating, by the system, a three-dimensional holographic image that reproduces the optical waves of the three-dimensional scene as reproduced optical waves, including reproducing the depth information and the disparity information to reproduce the three-dimensional depth and the parallax of the three-dimensional scene, as a function of respective portions of the visual information associated with the three-dimensional scene, wherein the respective portions of the visual information correspond to respective viewing positions in relation to the three-dimensional scene;
determining, by the system, a reproduced optical wave along a viewing position of the respective viewing positions that corresponds to a viewing perspective of respective viewing perspectives of the three-dimensional scene to facilitate reproducing an optical wave of the optical waves that is scattered by the three-dimensional scene along the viewing perspective to facilitate preserving the depth information and the disparity information of the three-dimensional scene in the three-dimensional holographic image, wherein the depth information comprises holographic information that facilitates presenting the three-dimensional depth with respect to the respective viewing perspectives by the three-dimensional holographic image; and
displaying, by the system, respective portions of the three-dimensional holographic image on respective display sections that correspond to the respective viewing positions in relation to the three-dimensional scene, wherein a display screen is divided into the respective display sections comprising at least four display sections that neighbor each other, with each display section of the at least four display sections having a triangular shape, and wherein the at least four display sections comprise a first display section, a second display section, a third display section, and a fourth display section, with a first side of the first display section being associated with a side of the second display section, a second side of the first display section being associated with a side of the third display section, and a point of the first display section formed from a connection of the first side to the second side being associated with a point of the fourth display section formed from a connection of two sides of the fourth display section to each other.

12. The method of claim 11, further comprising:
at least one of capturing or receiving, by the system, the respective portions of the visual information, comprising respective portions of original optical waves, including the original optical wave, scattered off of the three-dimensional scene;
converting, by the system, the respective portions of the visual information to a three-dimensional model of the three-dimensional scene;
converting, by the system, model data associated with the three-dimensional model to holographic data to facilitate producing the three-dimensional holographic image; and
producing, by the system, the respective portions of the three-dimensional holographic image based at least in part on the holographic data.

13. The method of claim 11, further comprising:
deriving, by the system, an off-axis hologram relating to the three-dimensional scene based at least in part on the respective portions of the visual information.

14. The method of claim 11, further comprising:
inputting, by the system, the respective portions of the three-dimensional holographic image into respective three-dimensional adapters;
modifying, by the system, the respective portions of the three-dimensional holographic image in accordance with at least one three-dimensional adapter parameter;
displaying, by the system, the respective portions of the three-dimensional holographic image on the display screen comprising the respective display sections; and
projecting, by the system, the respective portions of the three-dimensional holographic image from the respective display sections to respective portions of a display area to facilitate displaying the respective portion of the three-dimensional holographic image together as a single integrated three-dimensional holographic image.

15. The method of claim 14, wherein the at least one display screen is a single display screen, further comprising:
dividing, by the system, the display screen into the respective display sections.

16. The method of claim 15, further comprising:
identifying, by the system, one or more display section shapes that optimize the display area of the display screen based at least in part on the respective display sections; and
selecting, by the system, the one or more display section shapes, wherein the dividing the display screen further comprises dividing the display screen into the respective display sections that are respectively shaped in a form of at least one of the one or more display section shapes.

17. The method of claim 11, further comprising:
presenting, by the system, as part of the three-dimensional holographic image, the disparity information-associated with the respective viewing positions in relation to the three-dimensional scene, wherein the disparity information comprises a disparity portion of the optical waves scattered by the three-dimensional scene.

18. The method of claim 11, wherein the three-dimensional scene comprising at least one of a real scene or a synthesized scene that is at least one of static or animated.

19. A system, comprising:
means for capturing visual information associated with a three-dimensional scene, wherein the visual information comprises optical waves that are scattered by the three-dimensional scene and captured by the means for capturing, and wherein the optical waves, at least in part, comprise three-dimensional depth of the three-dimensional scene represented as depth information and parallax of the three-dimensional scene represented as parallax information;
means for producing a three-dimensional holographic image that reproduces the optical waves of the three-dimensional scene as reproduced optical waves, including reproducing the depth information and the parallax information to reproduce the three-dimensional depth and the parallax of the three-dimensional scene, based at least in part on respective portions of the visual information associated with the three-dimensional scene, wherein the respective portions of the visual information correspond to respective viewing perspectives in relation to the three-dimensional scene;
means for determining a reproduced optical wave of the reproduced optical waves that is along a viewing perspective of the respective viewing positions that corresponds to a visual perspective of respective visual perspectives of the three-dimensional scene to facilitate reproducing an optical wave of the optical waves that is scattered by the three-dimensional scene along the visual perspective to facilitate preserving the depth information and the parallax information of the three-dimensional scene in the three-dimensional holographic image, wherein the depth information comprises holographic information that facilitates presenting the three-dimensional depth with respect to the respective viewing perspectives by the three-dimensional holographic image; and
means for displaying respective portions of the three-dimensional holographic image on respective display sections that correspond to the respective viewing perspectives in relation to the three-dimensional scene, wherein a display screen is partitioned into the respective display sections comprising at least four display sections, wherein the at least four display sections are contiguous, with each display section of the at least four display sections having a triangular shape, and wherein the at least four display sections comprise a first display section, a second display section, a third display section, and a fourth display section, with a first side of the first display section being associated with a side of the second display section, a second side of the first display section being associated with a side of the third display section, and a point of the first display section formed from a connection of the first side to the second side being associated with a point of the fourth display section formed from a connection of two sides of the fourth display section to each other.

20. The system of claim 19, further comprising:
means for partitioning the display screen into the respective display sections based at least in part on a number of the respective viewing perspectives in relation to the three-dimensional scene.

* * * * *